(12) United States Patent
Smith-Rose et al.

(10) Patent No.: US 11,778,083 B2
(45) Date of Patent: *Oct. 3, 2023

(54) GENERATING A SCREENING INTERFACE FOR COMMUNICATIONS

(71) Applicant: Capital One Services, LLC, McLean, VA (US)

(72) Inventors: Asher Smith-Rose, Midlothian, VA (US); Tyler Maiman, Melville, NY (US); Lin Ni Lisa Cheng, New York, NY (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,969

(22) Filed: Jun. 13, 2022

(65) Prior Publication Data

US 2022/0394120 A1 Dec. 8, 2022

Related U.S. Application Data

(63) Continuation of application No. 17/340,320, filed on Jun. 7, 2021, now Pat. No. 11,431,833.

(51) Int. Cl.
| | | |
|---|---|---|
| *H04M 1/57* | (2006.01) | |
| *H04M 1/72* | (2021.01) | |
| *H04M 3/436* | (2006.01) | |
| *H04M 3/42* | (2006.01) | |
| *H04M 1/72469* | (2021.01) | |

(52) U.S. Cl.
CPC ....... *H04M 1/575* (2013.01); *H04M 1/72469* (2021.01); *H04M 3/42059* (2013.01); *H04M 3/436* (2013.01); *H04M 2203/558* (2013.01); *H04M 2242/08* (2013.01)

(58) Field of Classification Search
CPC ............. H04M 1/575; H04M 1/72469; H04M 3/42059; H04M 3/436; H04M 2203/558; H04M 2242/08
USPC ........................................ 379/142.06, 142.17
See application file for complete search history.

(56) References Cited

U.S. PATENT DOCUMENTS

| | | | | |
|---|---|---|---|---|
| 5,008,930 A | * | 4/1991 | Gawrys ............... | H04M 3/5183 |
| | | | | 379/212.01 |
| 6,456,706 B1 | * | 9/2002 | Blood .................. | H04M 15/73 |
| | | | | 379/199 |
| 9,497,607 B2 | * | 11/2016 | Sutcliffe ............... | H04M 19/04 |
| 9,996,825 B1 | * | 6/2018 | Casey .................. | G06Q 20/108 |
| 10,313,511 B1 | * | 6/2019 | Jiron ................... | H04M 3/2281 |
| 11,431,833 B1 | * | 8/2022 | Smith-Rose ...... | H04M 1/72469 |

(Continued)

*Primary Examiner* — Binh Kien Tieu
(74) *Attorney, Agent, or Firm* — Perkins Coie LLP

(57) ABSTRACT

Methods and systems are described herein for manipulating a communication acceptance screen, manipulating an interactive communication acceptance icon, and restricting access to accounts based on voice communication parameters. In particular, when a communication is detected from one device to another device, that communication may be risky. Thus, the risk is mitigated by giving a user information about the source of the communication to give a user a chance to reject the communication. In addition, in instances where the user accepts the communication, the system enables monitoring the communication and restricting any accounts that are disclosed within the communication.

20 Claims, 17 Drawing Sheets

(56) References Cited

U.S. PATENT DOCUMENTS

| | | | | |
|---|---|---|---|---|
| 2011/0002457 A1* | 1/2011 | Sharma | ............... | G06F 16/903 |
| | | | | 379/266.1 |
| 2011/0093327 A1* | 4/2011 | Fordyce, III | ....... | G06Q 30/0224 |
| | | | | 705/14.66 |
| 2011/0208783 A1* | 8/2011 | Dolphin | ............. | G06F 16/9535 |
| | | | | 707/E17.011 |
| 2013/0238413 A1* | 9/2013 | Carlson | ............... | G06Q 20/321 |
| | | | | 705/14.25 |
| 2014/0337089 A1* | 11/2014 | Tavares | ............ | G06Q 30/0201 |
| | | | | 705/7.29 |

* cited by examiner

| Entity | Identifier(s) | Profile Link |
|---|---|---|
| Public Service Electric & Gas Company | 555-987-6543<br>PSEG@domain.com<br>9867473737374 | <link1> |
| Jetblue Airways | 555-123-4567<br>Customer_service@jetblue.com<br>Jetblue@app1 | <link2> |
| Capital One Bank | 555-777-4567<br>Customer_service@capitalone.com | <link3> |
| Shady Traders | 666-777-4567<br>shady123@shadytraders.com | <link4> |
| Scammers Anonymous | 666-666-6666<br>666@scammers.com | <link5> |

300

| Identifier | Entity |
|---|---|
| 555-987-6543 | Public Service Electric & Gas Company |
| PSEG@domain.com | Public Service Electric & Gas Company |
| 98674737377374 | Public Service Electric & Gas Company |
| Jetblue Airways | 555-123-4567 |
| Jetblue Airways | Jetblue@app1 |

303 — Identifier column
306 — Entity column

FIG. 3

| Customer ID | Transaction Data | Payment Account | Status |
|---|---|---|---|
| 123456789 | <data 1> | abcd1234xyzac | Success |
| 123456543 | <data 2> | abcd1234xased | Success |
| 123456544 | <data 3> | abcd1234zxcv | Success |
| 123456555 | <data 4> | abcd1234mnbc | Success |
| 123456444 | <data 5> | abcd1234xyhjk | Success |

| Entity | Identifier(s) | Risk Value |
|---|---|---|
| Public Service Electric & Gas Company | 555-987-6543<br>PSEG@domain.com<br>98674737377374 | .8 |
| Jetblue Airways | 555-123-4567<br>Customer_service@jetblue.com<br>Jetblue@app1 | .8 |
| Capital One Bank | 555-777-4567<br>Customer_service@capitalone.com | .1 |
| Shady Traders | 666-777-4567<br>shady123@shadytraders.com | 9 |
| Scammers Anonymous | 666-666-6666<br>666@scammers.com | 10 |

FIG. 10

| Customer ID | Transaction Data | Payment Account | Status |
|---|---|---|---|
| 123456789 | <data 1> | abcd1234xyzac | Fail: Dispute |
| 123456543 | <data 2> | abcd1234xased | Fail: Dispute |
| 123456544 | <data 3> | abcd1234zxcv | Success |
| 123456555 | <data 4> | abcd1234mnbc | Fail:Dispute |
| 123456444 | <data 5> | abcd1234xyhjk | Fail:Dispute |

FIG. 11

GENERATING A SCREENING INTERFACE FOR COMMUNICATIONS

CROSS-REFERENCE TO RELATED APPLICATION(S)

This application is a continuation of U.S. patent application Ser. No. 17/340,320, filed Jun. 7, 2021. The content of the foregoing application is incorporated herein in its entirety by reference.

BACKGROUND

Currently, wireless communications have become a de facto standard for communicating between people. Billions of smart phones are being used in today's society. People use various methods to communicate using smart phones, with some of the popular being telephone calls, text messages, instant messages, emails, and other forms of communications. Some communication methods enable a person to determine whether to accept a communication, ignore the communication, or reject the communication. For example, if a person receives a phone call, many smart phones enable a recipient of a phone call to choose one of those options. Generally, with a few exceptions, a source phone number is displayed to the recipient of the call with a few options (e.g., accept the call, reject the call, send to voicemail, etc.). The recipient is also able to ignore the call. The same options may be available to a recipient of an Internet call (e.g., via a communication application installed on a smart phone or another smart device such as an electronic tablet). As mentioned above, in many cases the recipient of the call is only given a source phone number to decide whether to accept the call. If that source phone number is unknown to the recipient, the recipient may be subjected to an undesired phone call (e.g., from a scammer, an undesired business, etc.).

SUMMARY

The above-described issues may be addressed using several mechanisms. One mechanism for addressing these issues involves manipulating a communication acceptance screen to give a user more information about the incoming communication. The information may be related to the initiating entity and may be displayed on the communication acceptance screen. The operations for displaying the information may be performed by a communication processing system. A communication processing system may detect a request for a communication from a first communication device to a second communication device. For example, the communication processing system may reside, at least in part, on a smart phone or an electronic tablet associated with a user and may detect, for example, an incoming phone call from another device (e.g., from a device capable of placing phone calls).

When the call is received, the communication processing system may determine a first device identifier associated with the first communication device. For example, the communication processing system may determine a phone number of the source device (i.e., the device that is attempting to initiate a phone call). In another example, a smart phone may be receiving a voice communication through an application via the Internet; the source device may include an identifier unique to the application (e.g., that was generated for the source device when the application was installed on the source device).

When the communication processing system determines the identifier of the first device (i.e., the source device), the communication system may determine whether the first device identifier is stored in a device database. The communication system may have access to a database that stores known device identifiers and corresponding entities. For example, the database may store phone numbers or other identifiers associated with an enterprise. For example, a utilities company may be an entity stored in a database with corresponding phone number(s) for that utility company. Each entity may use one or more devices to communicate with, for example, the entity's customers. In some embodiments, those communication devices may be phone systems that have associated phone numbers. In some embodiments, device identifiers may include other identifiers (e.g., associated with a particular application through which communication may be enabled).

In response to determining that the first device identifier is stored in the device database (e.g., in response to determining that a phone number of a particular entity is found in the database) the communication processing system may perform the following operations. The communication processing system may retrieve a first profile associated with the first device identifier. The first profile may include entries corresponding to an entity associated with the first device identifier. For example, a profile associated with a utility company may include records of transactions between the utility company and people.

The communication processing system may also retrieve an account identifier associated with the second communication device. For example, the communication processing system may use the phone number of the recipient's device to identify the account identifier associated with the device. In another example, the communication processing system may access the account identifier from an application installed on the second communication device. The communication processing system may determine whether one or more entries of the plurality of entries include the account identifier. For example, each entry in the profile may include an account number for that entry. The account number may be associated with an account of a user or a household. To continue with the example above, if the entity is a utilities provider, the account number may be stored in the record and may be associated with the recipient of the communication attempt.

In response to determining that one of the entries includes the account identifier, the communication processing system may generate, for display on a communication acceptance screen, an indicator of an entry. For example, the communication processing system may generate for display some data from the entry (e.g., the name entity, transaction information associated with the entry, whether the entity is safe to communicate with, etc.). To continue with the example above, if a phone call is being initiated by a utilities provider, the communication processing system may detect the phone number of the incoming call and identify the utilities provider based on that phone number. The communication processing system may then search a transaction database for the utilities provider and if the utilities provider exists in the transaction database, the communication processing system may access the transaction entries for the provider. The communication processing system may retrieve an account number (e.g., for a user) to determine whether the account appears in the list of transactions for the utilities provider (e.g., if the number has been used in transactions with that provider). If the account number has been used, the communication processing system may display information from a matching entry on the call acceptance screen.

The communication processing system may further analyze the entries that match the account identifier to provide more information to the user. For example, if the entity is a postal service and the entity includes information about the date/time/type of postal service that was obtained, the communication processing system may give the user the information on the service.

In instances where the account number does not match any entries in the database associated with the profile, the communication processing system may determine whether the device identifier of the source device associated with an entity is safe to communicate with (e.g., that the device identifier is not associated with a scammer). The communication processing system may access the transactions in the profile and determine whether they have all succeeded or some have failed for various reasons. Based on that, the communication processing system may determine a risk level associated with the entity and generate, on a communication acceptance screen, the risk indicator.

In instances where the device identifier is not found in the database, the communication processing system may generate for display on the communication acceptance screen, a message that warns the user of an unknown device identifier. In some embodiments, the communication processing system may compare the unknown device identifier with contacts on the second device to determine whether the device identifier should be determined to be unknown.

Another mechanism for addressing these issues involves manipulating a communication acceptance interactive icon to give a user more information about the incoming communication. The communication processing system may detect a request for a communication from a first communication device to a second communication device. The communication may be a phone call or a voice communication request using a voice communication enabled Internet application. The communication processing system may determine a device identifier associated with the first communication device. For example, the communication processing system may receive a phone number associated with the device that is attempting to initiate the phone call. When the communication processing system determines the device identifier, the communication processing system may compare the device identifier with device identifiers in a device database. For example, the communication processing system may have access to a database that stores records for device identifiers (e.g., phone numbers, IMEI, MAC address, etc.). The record may include the device identifier and a corresponding risk value for that device identifier.

The communication processing system may determine whether the device identifier is stored in the device database. For example, the communication processing system may traverse phone numbers stored in the database and determine whether one of the phone numbers in the database matches the phone number of the device attempting communications. In response to determining that the device identifier is stored in the device database the communication processing system may perform the following operations. The communication processing system may retrieve a record associated with the device identifier. The record may include one or more entries for an entity associated with the device identifier. For example, the entity may be a particular company. The record may include other information about the company (e.g., a risk value associated with the company).

The communication processing system may determine, based on the one or more entries, a risk value associated with the first communication device. For example, the risk value may be a value calculated based on the transactions conducted by the entity associated with first communication device. In particular, the entity may be a particular enterprise that performs a service (e.g., a technology service). The risk indicator may be calculated based on the transaction data associated with the particular enterprise. For example, if the particular enterprise has a threshold number of invalid transactions, the risk value may be higher if the particular enterprise has no invalid transactions. When the communication processing system determines the risk value, the communication processing system may generate for display an indication of the risk value overlaid over an interactive icon that enables acceptance of the communication. The risk value may be converted into one of a plurality of risk indicators based on a threshold comparison. For example, the risk indicator may be text (e.g., "safe" or "unsafe"), an image, an animated graphic, or another suitable indicator.

In some instances, the device identifier (e.g., the phone number, IMEI, MAC address, etc.) may not be found in the database. In response, the communication processing system may generate an overlay that indicates that the device identifier of the initiating device has not been located. In addition, the communication processing system may generate for display one or more options for the user. For example, one option may warn the user to be vigilant when communicating with the initiating device. Another option may be to add the device identifier into a list of verified/approved devices. The list may be specific to the user or may apply to other users as well.

Another mechanism for addressing these issues involves a communication processing system that detects that a communication has been initiated with a known scammer. The communication is monitored for account information within the communication. If account information is detected within the communication, the communication processing system may assign a restriction to the affected account. In particular, the communication processing system may detect a communication between a first communication device and a second communication device. For example, the communication processing system may detect that a phone conversation has been initiated between two telephones.

The communication processing system may retrieve one or more parameters associated with the communication. For example, the communication processing system may retrieve phone numbers of the devices that are part of the communication as well as other metadata (e.g., corresponding entities associated with the phone numbers). The communication processing system may determine, based on the one or more parameters associated with the communication, a risk level associated with the communication. For example, each phone number (or another device identifier) may be stored in a database with a corresponding risk level. In another example, a device profile may be stored in the database with corresponding records for the entity associated with the device identifier (e.g., a phone number). The communication processing system may retrieve the risk value from the database.

In response to determining that the risk level of the communication exceeds a risk threshold, initiating monitoring of the communication. For example, the risk value may be stored in various forms in the database. One form may be a numerical value, while another form may be a binary value (e.g., safe/unsafe). The risk threshold may also be in various forms. For example, the risk threshold may be a numerical value (e.g., for numerically stored risk values). In another example, the threshold may be a binary value (e.g., determining whether the initiating entity is safe/unsafe). Furthermore, the communication may take various forms. For example, the communication may be a voice communication over a telephone connection. In another example, the communication may be a voice communication over the Internet using an application that enables such communications. In yet another example, the communication may be a textual/visual message exchange that, for example, may include text and images/videos. Thus, the communication processing system may monitor any of those protocols. In the instances where the communication is a voice communication, the communication processing system may transform (e.g., via a voice recognition application) the voice data into textual data.

As the communication processing system monitors the communications, the communication monitoring system may detect account access information indicated in the communication. For example, if the communication is a voice communication, the communication processing system may be receiving textual data from a voice recognition application. The communication processing system may search through the textual data to determine whether account information has been revealed in the communication. If the communication is not a voice communication, but a textual/image/video communication, the communication processing system may try to identify account information with the text (e.g., by analyzing the text for account numbers), within the images (by determining, for example, using machine learning that an account number image has been detected), and/or within a video, which may be a combination of detecting account numbers within text and video.

In response to detecting the account access information in the communication, the communication processing system may update an account associated with the account access information with a restriction. The restriction may restrict one or more actions associated with the account. For example, the restriction may temporarily disable the account, or restrict a particular entity (e.g., associated with the communicating device) from accessing the account. In another example, a restriction may force the user to reactivate the account or confirm access to the account.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 3 illustrates a database index, in accordance with one or more embodiments.

FIG. 4 illustrates a table for storing transaction data and status, in accordance with one or more embodiments.

FIG. 10 illustrates a table for storing risk values, associated entities and identifiers, in accordance with one or more embodiments.

FIG. 11 illustrates a table for storing transaction data and status, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
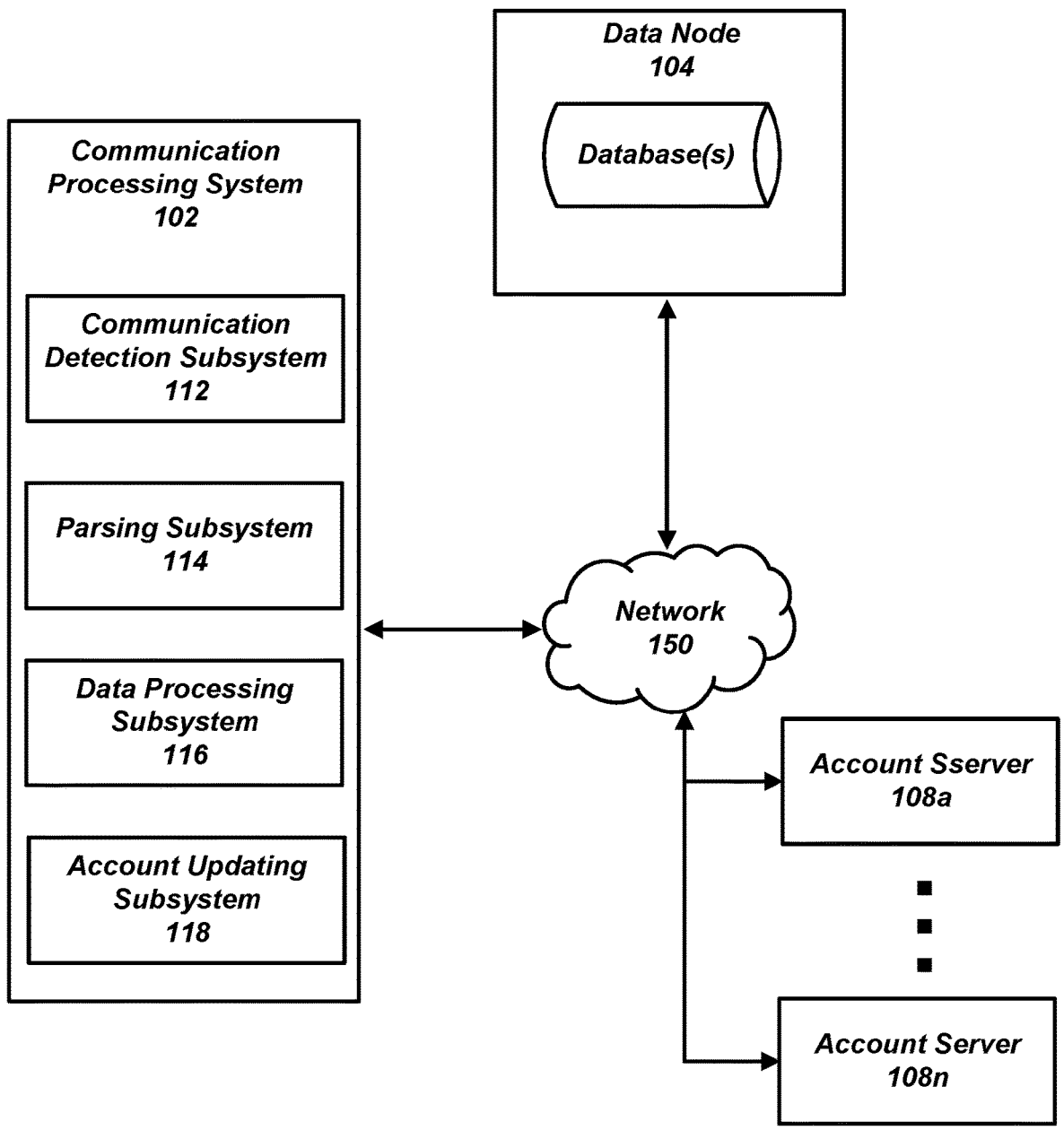
FIG. 1 shows an illustrative system for manipulating a communication acceptance screen, manipulating an interactive communication acceptance icon, and restricting access to accounts based on voice communication parameters, in accordance with one or more embodiments of this disclosure.

FIG. 1 shows environment 100 that may be used for warning a user of unsafe communications. Environment 100 includes communication processing system 102, data node 104, and account servers 108a-108n. Communication processing system 102 may execute instructions for warning a user of unsafe communications. Communication processing system 102 may include software, hardware or a combination of the two. For example, communication processing system 102 may be a physical server or a virtual server that is running on a physical computer system.

Data node 104 may store various data, including one or more databases for storing device information (e.g., device identifiers), and entity profiles/records for associated devices. In some embodiments, data node 104 may store other data used by communication processing system 102. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Account servers 108a-108n may be server computing devices (e.g., physical servers, virtual servers, and/or other suitable computing devices to store and process account information).

Manipulating a Communication Acceptance Screen

Communication processing system 102 may be configured to manipulate a communication acceptance screen to give a user more information about the incoming communication. Communication processing system 102 may include a number of subsystems. Specifically, communication processing system 102 may include a communication detection subsystem 112, a parsing system 114, a data processing subsystem 116, and/or an account updating system 118. Each of these subsystems may include software, hardware or a combination of the two. For example, communication detection subsystem 112 may include a microphone (e.g., shared by other subsystems) and software to identify and process different types of communications. Parsing subsystem 114 may include a processor (e.g., shared by other subsystems) and software to parse different types of communications. For example, parsing subsystem 114 may include a voice recognition algorithm and an image recognition algorithm. The other subsystem may include various hardware and software components. Communication processing system 102 may reside on a communication device, a server (e.g., data node 104), or on a combination of both.

Communication detection subsystem 112 may detect a request for a communication from a first communication device (not shown) to a second communication device (not shown). For example, communication detection subsystem 112 may reside on a voice-enabled communication device (e.g., a smart phone, an electronic tablet, or another suitable device). In some embodiments, the communication device may be a wearable device (e.g., a smart watch or a similar device). The wearable device may be a stand-alone device or may connect to a smart phone for performing some functions. For example, a wearable device may be a smart watch that has an Internet connection via a Wi-Fi-enabled component and/or a cellular-enabled component. In some embodiments, the wearable device may connect to a smart phone (e.g., via Bluetooth protocol) and perform operations through the smart phone (e.g., receive phone calls, messages, etc.). Communication detection subsystem 112 may detect that a first device is calling the second device. Thus, in some embodiments, the first and second devices may be voice-enabled communication devices (e.g., smart phones). In some embodiments, a communication device that is attempting a communication (e.g., is sending a communication request) may be an autonomous system that is attempting to connect with the other communication device to relay an automated message (e.g., a robo call).

In some embodiments, communication detection subsystem 112 may use an Application Programming Interface (API) to detect the attempted communication from the first communication device to the second communication device. For example, the API may enable communication detection subsystem 112 to get notifications when an incoming communication is requested. This may be accomplished by having communication detection subsystem 112 to subscribe to alerts (e.g., using the API) so that communication detection subsystem 112 is alerted when a request for communication is detected.

In some embodiments, communication detection subsystem 112 may reside on the communication device that is receiving the communication request while, in some embodiments, communication detection subsystem 112 may reside on a server device (e.g., a server device that processes communications between devices). When communication detection subsystem 112 resides on the communication device, the operating system of the communication device may include the API to notify communication detection subsystem 112 when the request for communication is received. When communication detection subsystem 112 resides on the server device, server software that processes/routes communication requests may include the API to notify the communication detection subsystem 112.

When communication detection subsystem 112 detects the request for the communication, communication detection subsystem 112 may determine a first identifier associated with the first communication device. For example, if the request for communication is a telephone call, communication detection subsystem 112 may receive a telephone number associated with the communication device that is requesting the communication. The telephone number may be received as part of caller identifying technology. In another example, the request for communication may be a request using an application to enable Internet voice communication. One example of such an application may be WhatsApp™ while another is Signal™. Thus, each Internet application may have an identifier associated with a particular user which may be used on various communication devices when the user logs into the application. In some embodiments, however, the identifier may be a device identifier such as an International Mobile Equipment Identity (IMEI) or a Media Access Control (MAC) address.

In yet another example, the communication request may be a request to start a communication using a messaging service (e.g., via Simple Message Service (SMS) and/or Multimedia Messaging Service (MMS)). Thus, in some embodiments, (e.g., where the request for communication is transmitted through an application that enables users to communicate through the Internet) communication detection subsystem 112 determines whether the request is for voice communication or non-voice communication (e.g., text or image). In some embodiments, voice communication may be a communication using a combination of video and audio. Communication detection subsystem 112 may pass the identifier (and other information about the communication, if available) to parsing subsystem 114.

Figure 2:
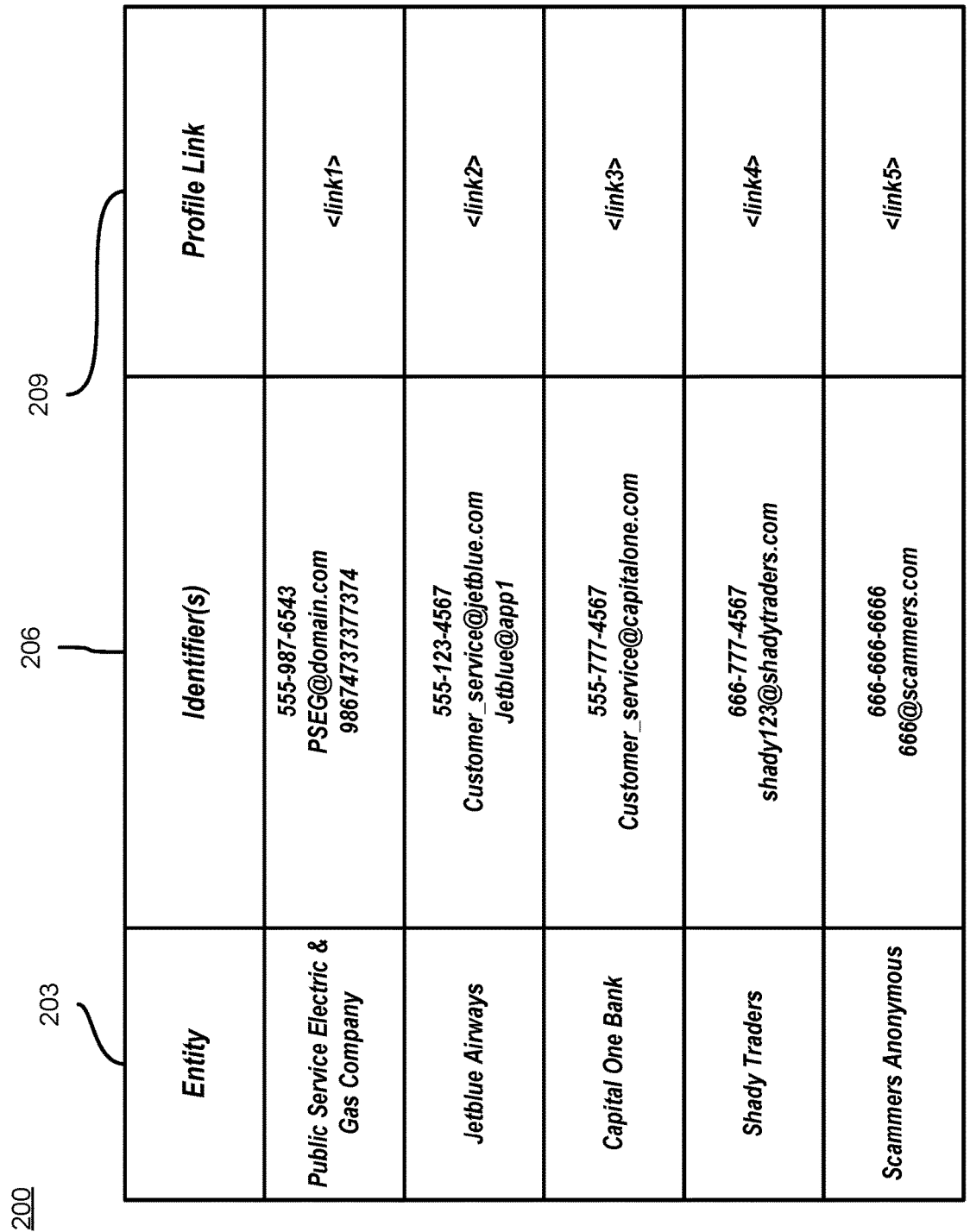
FIG. 2 illustrates a table for storing identifiers and profiles, in accordance with one or more embodiments of this disclosure.

Parsing subsystem 114 may determine whether the first identifier is stored in a database. For example, the database may reside on data node 104 and store identifiers associated with various entities. In addition, each entity may be associated with a profile. FIG. 2 illustrates table 200 that may be stored in the database hosted on, for example, data node 104. Table 200 may include column 203 indicating entity identifiers. Entity identifiers may correspond to various corporations (e.g., airlines, utilities companies, financial institutions, and others). Column 206 may store various identifiers associated with corresponding entities. For example, the identifiers may be telephone numbers, IMEI, MAC addresses, email addresses, numeric identifiers, alphanumeric strings, or other suitable identifiers. Column 209 may include profile links associated with each entity in the table. In some embodiments, instead of a profile link, the profile itself may be included in column 209. The profile may include one or more transactions associated with the entity.

In some embodiments, the database may include an index that includes a list of identifiers and corresponding references to an entity in an entity table (e.g., an entity in the table of FIG. 2). FIG. 3 illustrates indexing table 300 with column 303 storing identifiers and column 306 storing an entity identifier or a link to the entity table. As illustrated in the table of FIG. 3 there may be multiple identifiers for the same entity. Thus, parsing subsystem 114 may query the database with the identifier and receive a response back from the database whether the identifier has been located.

In response to determining that the first device identifier is stored in the database, communication processing system 102 may perform the following operations. Parsing subsystem 114 may request the profile associated with the identifier. When the profile is received, parsing subsystem 114 may pass the profile to data processing subsystem 116. Data processing subsystem 116 may receive the profile associated with the first identifier. The profile may include one or more entries corresponding to an entity associated with the first identifier. Thus, the profile may correspond to a particular entity (e.g., Public Service Electric & Gas Company). The profile may include one or more transactions associated with the entity.

FIG. 4 illustrates an exemplary table 400 that stores transaction data for a particular entity. Table 400 may be part of the profile. Table 400 includes a column 403 that identifies a customer (e.g., a particular household that a utilities company serves). The customer identifier may be a text string, a numeric string, alphanumeric, an alphanumeric string, a hexadecimal string, etc. The customer identifier may also be stored in another suitable format. Column 406 may store transaction data for the particular customer. The transaction data may include an amount of payment that was due, the due date, usage data (e.g., an amount of electricity and/or gas a given customer used per month), and/or other suitable transaction data. Column 409 may include a payment account associated with a particular transaction. The payment account may be a credit card number, debit card number, checking account number, and/or another suitable payment account. Column 412 may store a status field of the transaction, thus indicating whether the transaction has been successfully processed. If the transaction has not been successful, column 412 may show failure. In some embodiments, column 412 may include a reason for failure. For example, if the customer voided the transaction, disputed the transaction, or if the account is invalid or does not have enough funds, table 400 may store an indicator for each type/reason for failure.

Data processing subsystem 116 may retrieve an account identifier associated with the second communication device. For example, a user may have one or more accounts stored on the communication device. Those accounts may be part of the user's digital wallet on the mobile device or may be stored in another application (e.g., a banking application or a credit card application). Thus, data processing subsystem 116 may access those applications to retrieve one or more account identifiers associated with that second communication device. In some embodiments, (e.g., where data processing subsystem 116 is not being executed on a user device (e.g., not executed on the second communication device) but is executed on a server), data processing subsystem 116 may access a database that stores account identifiers associated with various users/communication devices and retrieve one or more account identifiers associated with that user/communication device.

In some embodiments, data processing subsystem 116 may perform the following operations for retrieving the account identifier associated with the second communication device. Data processing subsystem 116 may retrieve a second identifier associated with the second communication device. For example, data processing subsystem 116 may retrieve a telephone number associated with the second communication device (e.g., the communication device that is receiving the communication request). Data processing subsystem 116 may compare the second device identifier with a plurality of device identifiers associated with a plurality of accounts. For example, data node 104 may store one or more accounts for a plurality of users and also associated identifiers (e.g., phone numbers). Thus, data processing subsystem 116 may iterate through each identifier (e.g., phone number) and determine which one matches a profile associated with the user of the second device. In some embodiments, the entries may be found using a hash lookup. For example, before each identifier is stored, a hash algorithm may be executed against the identifier and the hash may be stored instead of the identifier. Thus, when data processing subsystem 116 attempt to match the identifier, data processing subsystem 116 may execute the same hash algorithm against the identifier before performing the search.

Data processing subsystem 116 may determine, based on comparing the second identifier with the plurality of identifiers, that the second identifier matches an identifier corresponding to an account of the plurality of accounts. That is, data processing subsystem 116 may locate an account list associated with the user corresponding to the second communication device. Data processing subsystem 116 may then retrieve the account identifier associated with the account of the plurality of accounts. In some embodiments data processing subsystem 116 may retrieve multiple account identifiers.

Data processing subsystem 116 may determine whether one or more entries of the plurality of entries include the account identifier (e.g., one of the account identifiers associated with the second communication device/user of that device). To make this determination, data processing subsystem 116 may select each account identifier and compare each of those account identifiers with account identifiers stored within the transaction associated with the entity that is requesting the communication. For example, data processing subsystem 116 may iterate through each payment account in column 409 of FIG. 4 to determine whether one of the accounts matches.

Figure 5:
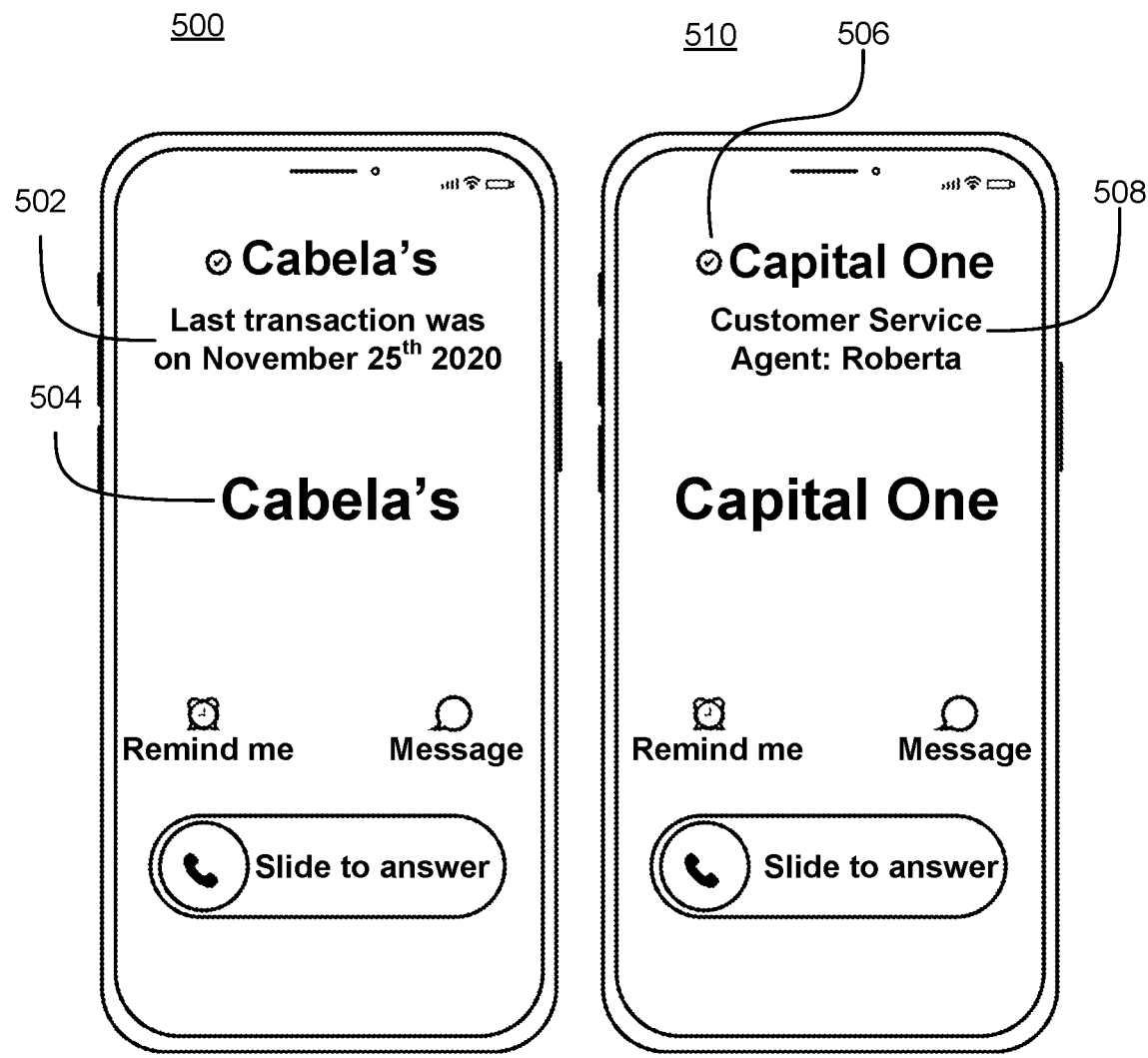
FIG. 5 illustrates user interfaces, in accordance with one or more embodiments.

Data processing subsystem 116 may, in response to determining that the one or more entries include the account identifier, generate for display, on a communication acceptance screen, an indicator of an entry of the one or more entries that includes the account identifier. FIG. 5 illustrates two exemplary communication acceptance screens according to some of the embodiments of this disclosure. Device 500 shows one example of the communication acceptance screen. Device 500 shows an indicator 502 indicating the last transaction with the entity. Thus, in this case, data processing subsystem 116 may determine which of the matching transactions had the latest associated transaction date and generate for display that date in the communication acceptance screen.

In some embodiments, data processing subsystem 116 may generate for display on the communication acceptance screen, indicator 504 which may indicate the entity associated with the communication device that is requesting a communication. For example, indicator 504 may be textual or may include an image (e.g., logo, trademark, etc.) associated with the entity. The image may be stored in the database with the profile of the entity. Device 510 illustrates another communication acceptance screen. Indicator 508 may indicate other data associated with the profile of the entity. For example, data processing subsystem 116 may retrieve a last transaction associated with the entity for the account associated with the device, requesting the communication and retrieve transaction data associated with that transaction. Data processing subsystem 116 may generate for display some of the transaction data (e.g., a customer service representative information if the last transaction includes a particular customer service person).

In some embodiments, the transaction data may include other information (e.g., information about items that were acquired as a result of the transaction). Thus, data processing subsystem 116 may retrieve the one or more entries of the plurality of entries that include the account identifier and determine, based on the one or more entries, an item associated with an account corresponding to the account identifier. Data processing subsystem 116 may generate for display, on the communication acceptance screen, an indication of the item.

Indicator 506 may indicate a risk level associated with the requesting communication device (e.g., whether the device is associated with an unsafe entity). For example, data processing subsystem 116 may iterate through each transaction in the profile associated with the entity and determine whether any fraudulent transactions exist in the profile. Data processing subsystem 116 may compare the status field of the transaction to determine whether each transaction is successful and if not, the reason for failure. Thus, if all transactions are successful, data processing subsystem 116 may determine that the entity is safe and generate for display indicator 506. In some embodiments, the data in the status field may include a hash of the status. Thus, data processing subsystem 116 may perform the comparison using hashed data.

Figure 6:
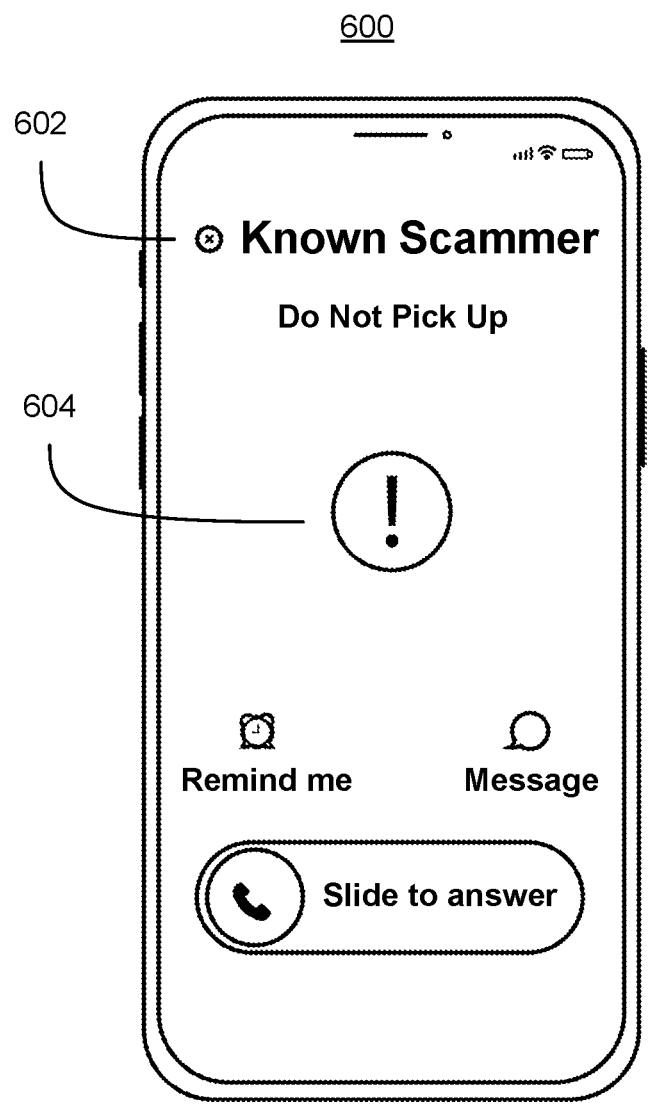
FIG. 6 illustrates another user interface, in accordance with one or more embodiments.

In some embodiments, data processing subsystem 116 may determine that the entity is not safe. For example, data processing subsystem 116 may determine that one or more fraudulent transactions are associated with the entity. To make the determination, data processing subsystem 116 may iterate through transactions in the profile of the entity (e.g., a list of transactions as illustrated in FIG. 4) and determine that one or more status indicators for one or more transactions indicate that those transactions are fraudulent. Based on the determination, data processing subsystem 116 may generate for display (e.g., on the communication acceptance screen) one or more safety indicators that indicate that the entity is not safe. FIG. 6 illustrates examples of these indicators. It should be noted that not all indicators must be displayed, and the display may differ in various embodiments. Indicator 602 indicates (via text and image data) that the entity is not safe. Indicator 604 is an image indicator indicating that the entity is not safe.

Figure 7:
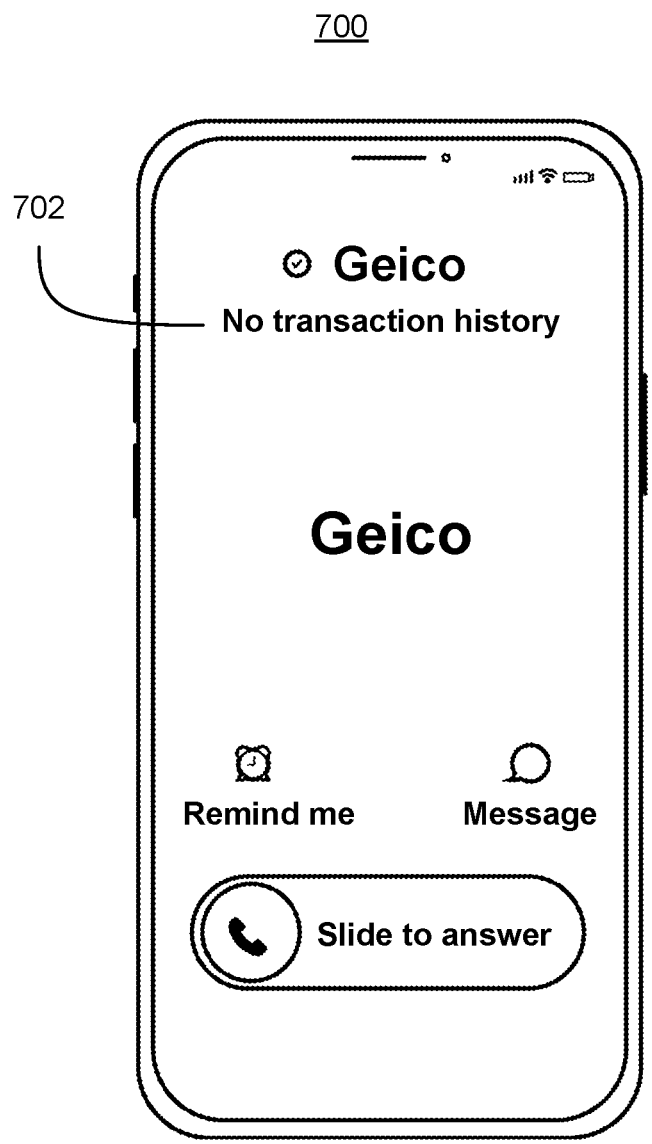
FIG. 7 illustrates another user interface, in accordance with one or more embodiments.

In some embodiments, data processing subsystem 116 may determine that the entries in the profile of the entity do not include any entry with the account identifier but include a second entry with a different account identifier. For example, data processing subsystem 116 may locate the profile associated with the communication device requesting the communication, but no account identifier associated with the user may be found in the profile (e.g., within the transactions associated with the entity). That is, the entity may exist, and the profile may exist, but the user associated with the second device may have had no transactions with the entity. However, other account identifiers may be stored in the profile corresponding to other users that transacted with that entity. Based on that determination, data processing subsystem 116 may generate, for display on a communication acceptance screen, an indication of no transaction history as shown in FIG. 7. Indicator 702 shows that there is no transaction history associated with the user of the communication receiving device and also indicates that the entity is safe. That is, in response to determining that the entries do not include the account identifier and include the different account identifier, data processing subsystem 116 may generate for display, on the communication acceptance screen, an indication of the entity associated with the first device identifier. In some embodiments, the communication acceptance screen may indicate the particular transaction indirectly by including, for example, a time range for the transaction, a time frame associated with the transaction (e.g., last 30 days, recently, a while ago, etc.) or another suitable indirect indication.

Figure 8:
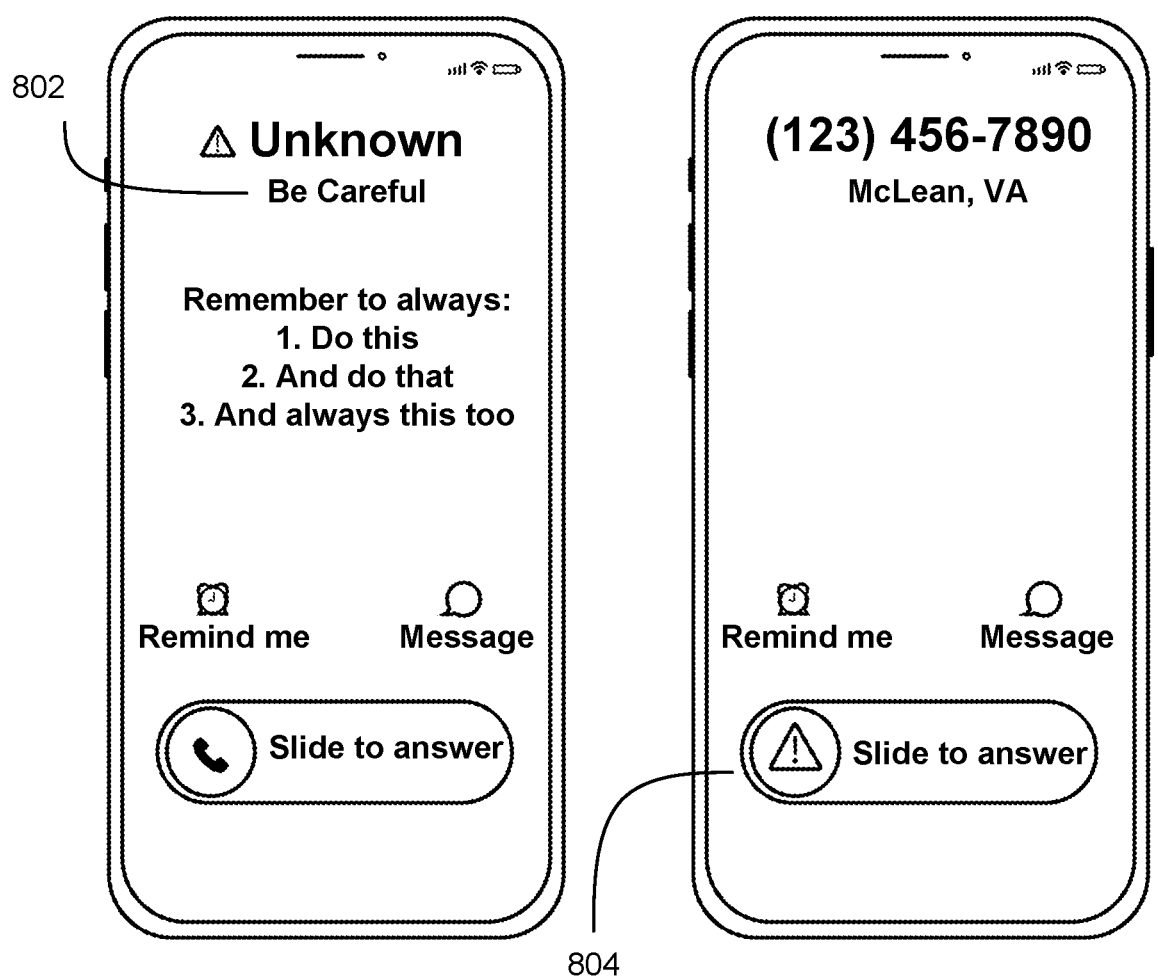
FIG. 8 illustrates other user interfaces, in accordance with one or more embodiments.

In some embodiments, an identifier of the device requesting the communication may not be found. Thus, in response to determining that the first identifier is not stored in the device database, data processing subsystem 116 may generate for display one or more indicators indicating that the first identifier is not stored in the database. FIG. 8 illustrates two techniques for indicating that the device is not stored in the database. Display 800 includes an indicator 802 that indicates that the first identifier is unknown. In some embodiments, data processing subsystem 116 may suggest a number of actions to take, or not to take, based on this information.

In some embodiments, data processing subsystem 116 may modify the display of an interactive communication acceptance icon based on the first identifier not being stored in the database. Display 810 includes an interactive communication acceptance icon 804 with the displayed indicator.

In some embodiments, parsing subsystem 114 may determine that the identifier of the communication device requesting the communication is stored in the database. However, the identifier may be associated with a known scammer (e.g., an entity that is known to perform fraudulent transactions). Thus, parsing subsystem 114 may detect a second request for a second communication from a third communication device to the second communication device. For example, parsing subsystem 114 may detect a phone call from another communication device. Parsing subsystem 114 may determine a second device identifier associated with the third communication device. For example, parsing subsystem 114 may retrieve a phone number associated with the device requesting communication.

Data processing subsystem 116 may determine whether the second identifier is stored in the device database. Data processing subsystem 116 may transmit a query to the database for the profile associated with the second identifier. The query may include the identifier. Data processing subsystem 116 may determine that the second identifier is stored in the database based on the response to the query. In response to determining that the second identifier is stored in the device database, data processing subsystem 116 may retrieve a second profile associated with the third communication device. The second profile may include a flag that indicates a risk level associated with the third communication device. For example, the profile may include a flag that indicates whether the entity is safe. The flag may be generated based on the transactions with the profile. If one or more transactions are determined to be fraudulent, data processing subsystem 116 may set a flag in the profile indicating a high risk level. However, if there are no fraudulent transactions within the profile, data processing subsystem 116 may set a flag in the profile indicating a low risk level. In response to determining that the risk level satisfies a threshold, data processing subsystem 116 may modify or replace an interactive icon to accept the second communication and an indication of the risk level. For example, indicator 804 illustrates replacing or modifying the icon.

In some embodiments, data processing subsystem 116 may modify the risk level based on an attestation level of the received device identifier (e.g., for a device requesting the communication). For example, data processing subsystem 116 may determine, based on a session initiation protocol (SIP) identifier certificate, an attestation level associated with the first communication device. Various attestation levels may be detected based on a certificate associated with the communication. Thus, if an attestation level indicates the information is not very reliable, data processing subsystem 116 may adjust the risk level to be higher. Thus, data processing subsystem 116 may generate a risk level for the first communication device based on the attestation level.

Figure 9:
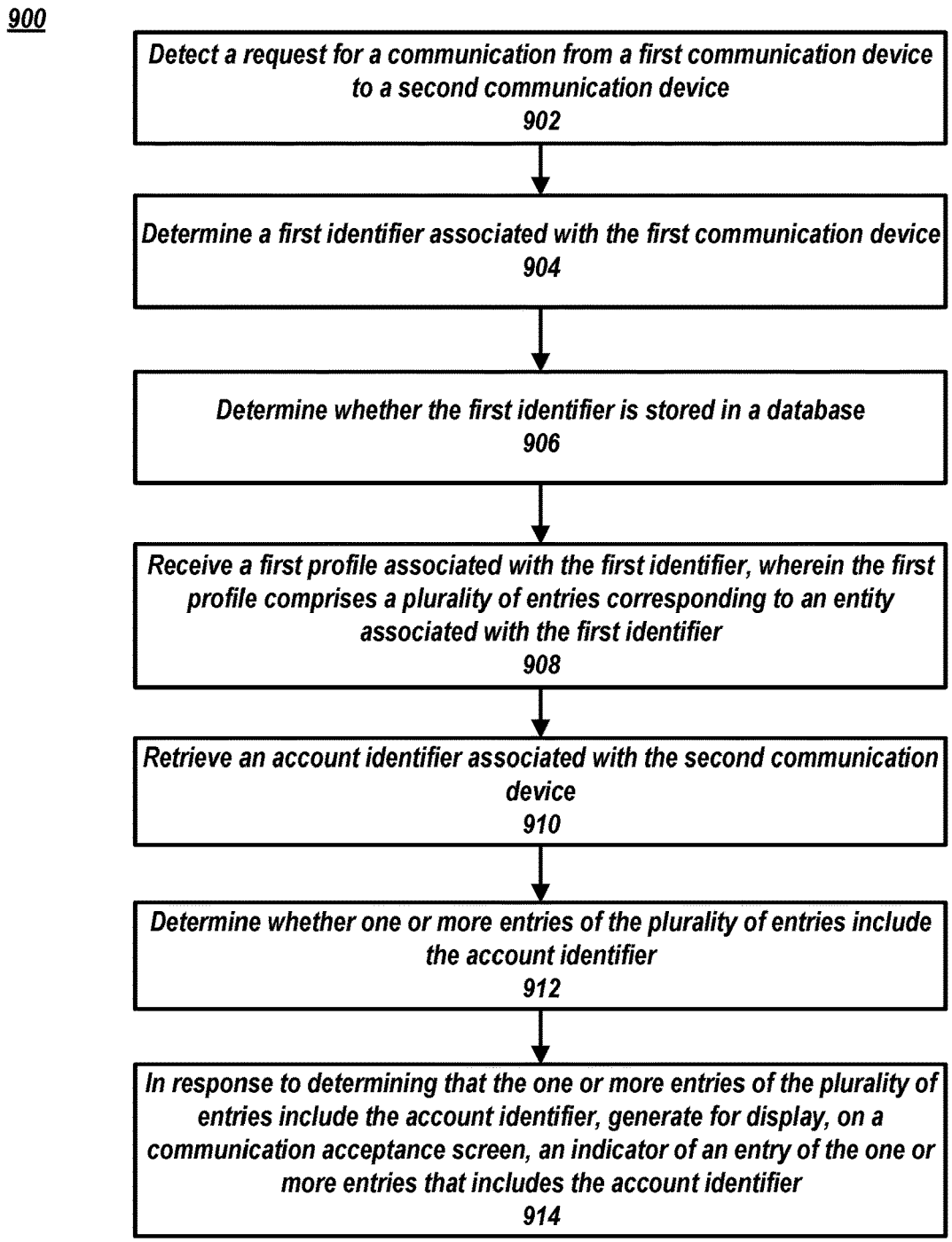
FIG. 9 is a flowchart of operations for manipulating a communication acceptance screen, in accordance with one or more embodiments.

FIG. 9 is a flowchart 900 of operations for manipulating a communication acceptance screen. The operations of FIG. 9 may use components described in relation to FIG. 16 described later in this disclosure. In some embodiments, communication processing system 102 may include one or more components of computer system 1600.

At 902, communication processing system 102 detects a request for a communication from a first communication device to a second communication device. For example, the communication processing system 102 may reside on a mobile device (e.g., a smart phone or an electronic tablet). Thus, the communication processing system 102 may detect an incoming phone call. In some embodiments, the communication processing system 102 may reside on a server device that processes communications between two devices. Thus, the communication processing system 102 may make the detection at the server.

At 904, communication processing system 102 determines a first identifier associated with the first communication device. For example, communication processing system 102 may use one or more processors 1610a-1610n to perform the determination. At 906, communication processing system 102 determines whether the first identifier is stored in a database. For example, data processing system 102 may use one or more processors 1610a-1610n to generate a query for looking up the identifier in the database and transmit the query, using network interface 1640, to the database.

At 908, communication processing system 102 receives a first profile associated with the first identifier. The first profile may include a plurality of entries corresponding to an entity associated with the first identifier. For example, communication processing system 102 may receive the first profile from the database via network interface 1640 and store the profile in system memory 1620. At 910, communication processing system 102 retrieves an account identifier associated with the second communication device. For example, if the communication processing system 102 resides on a mobile device, a digital wallet may be stored on the mobile device and an API may be available to retrieve the account identifier from, for example, system memory 1620. At 912, communication processing system 102, determines whether one or more entries of the plurality of entries include the account identifier. For example, communication processing system 102 may use one or more processors 1610a-1610n to perform the determination. At 914, communication processing system, in response to determining that the one or more entries of the plurality of entries include the account identifier, generates for display, on a communication acceptance screen, an indicator of an entry of the one or more entries that includes the account identifier. In some embodiments, operations 908-914 may be performed in response to determining that the first identifier is stored in the database.

The present techniques will be better understood with reference to the following enumerated embodiments:

1. A method comprising: detecting a request for a communication from a first communication device to a second communication device; determining a first identifier associated with the first communication device; determining whether the first identifier is stored in a database; and in response to determining that the first identifier is stored in the database: receiving a first profile associated with the first identifier, wherein the first profile comprises a plurality of entries corresponding to an entity associated with the first identifier; retrieving an account identifier associated with the second communication device; determining whether one or more entries of the plurality of entries include the account identifier; and in response to determining that the one or more entries of the plurality of entries include the account identifier, generating for display, on a communication acceptance screen, an indicator of an entry of the one or more entries that includes the account identifier.

2. The method of any of the preceding embodiments, further comprising: determining that the plurality of entries does not include any entry with the account identifier and includes a second entry with a different account identifier; and in response to determining that the plurality of entries does not include the account identifier and includes the different account identifier, generating for display, on the communication acceptance screen, an indication of the entity associated with the first identifier.

3. The method of any of the preceding embodiments, further comprising: in response to determining that the first identifier is not stored in the database, modify or replace an interactive communication acceptance icon with indication that the first identifier is not stored in the database.

4. The method of any of the preceding embodiments, wherein retrieving the account identifier associated with the second communication device comprises: retrieving a second identifier associated with the second communication device; comparing the second identifier with a plurality of identifiers associated with a plurality of accounts; determining, based on comparing the second identifier with the plurality of identifiers, that the second identifier matches an identifier corresponding to an account of the plurality of accounts; and retrieving the account identifier associated with the account of the plurality of accounts.

5. The method of any of the preceding embodiments, wherein the communication acceptance screen comprises a date associated with the entry of the one or more entries.

6. The method of any of the preceding embodiments, further comprising: detecting a second request for a second communication from a third communication device to the second communication device; determining a second identifier associated with the third communication device; determining whether the second identifier is stored in the database; in response to determining that the second identifier is stored in the database, retrieving a second profile associated with the third communication device, wherein the second profile comprises a flag that indicates a risk level associated with the third communication device; and in response to determining that the risk level satisfies a threshold, modifying or replacing an interactive icon with an indication of the risk level.
7. The method of any of the preceding embodiments, further comprising: determining based on a session initiation protocol identifier certificate an attestation level associated with the first communication device; and generating a risk level for the first communication device based on the attestation level.
8. The method of any of the preceding embodiments, further comprising: retrieving the one or more entries of the plurality of entries that include the account identifier; determining, based on the one or more entries, an item associated with an account corresponding to the account identifier; and generating for display, on the communication acceptance screen, an indication of the item.
9. A system comprising: one or more processors; and memory storing instructions that, when executed by the processors, cause the processors to effectuate operations comprising those of any of embodiments 1-8.
10. A system comprising means for performing any of embodiments 1-8.
11. A system comprising cloud-based circuitry for performing any of embodiments 1-8.

Manipulating an Interactive Communication Acceptance Icon

Communication processing system 102 may be configured to manipulate an interactive icon that enables acceptance of the communication using its subsystems. Communication detection subsystem 112 may detect a request for a communication from a first communication device to a second communication device. For example, communication detection subsystem 112 may reside on a voice-enabled communication device (e.g., a smart phone, an electronic tablet, or another suitable device). The communication detection subsystem may detect that a first device is calling the second device. Thus, in some embodiments, the first and second devices may be voice-enabled communication devices (e.g., smart phones). In some embodiments, a communication device that is attempting a communication (e.g., is sending a communication request) may be an autonomous system that is attempting to connect with the other communication device to relay an automated message (e.g., a robo call).

In some embodiments, communication detection subsystem 112 may use an Application Programming Interface (API) to detect the attempted communication from the first communication device to the second communication device. For example, the API may enable the communication detection subsystem to receive notifications when an incoming communication is requested. This may be accomplished by having communication detection subsystem 112 subscribe to alerts (e.g., using the API) so that communication detection subsystem 112 is alerted when a request for communication is detected.

In some embodiments, communication detection subsystem 112 may reside on the communication device that is receiving the communication request while, in some embodiments, communication detection subsystem 112 may reside on a server device (e.g., a server device that processes communications between devices). When communication detection subsystem 112 resides on the communication device, the operating system of the communication device may include the API to notify communication detection subsystem 112 when the request for communication is received. When communication detection subsystem 112 resides on the server device, server software that processes/routes communication requests may include the API to notify the communication detection subsystem 112.

When communication detection subsystem 112 detects the request for the communication, communication detection subsystem 112 may determine an identifier associated with the first communication device. For example, if the request for communication is a telephone call, communication detection subsystem 112 may receive a telephone number associated with the communication device that is requesting the communication. The telephone number may be received as part of caller identifying technology. In another example, the request for communication may be a request using an application to enable Internet voice communication. One example of such an application may be WhatsApp™ while another is Signal™. Thus, each Internet application may have an identifier associated with a particular user which may be used on various communication devices when the user logs into the application. In some embodiments, however, the identifier may be a device identifier such as an International Mobile Equipment Identity (IMEI) or a Media Access Control (MAC) address.

In yet another example, the communication request may be a request to start a communication using a messaging service (e.g., via Simple Message Service (SMS) and/or Multimedia Messaging Service (MMS)). Thus, in some embodiments, (e.g., where the request for communication is transmitted through an application that enables users to communicate through the Internet) communication detection subsystem 112 determines whether the request is for voice communication or non-voice communication (e.g., text or image). In some embodiments, voice communication may be a communication using a combination of video and audio. Communication detection subsystem 112 may pass the identifier (and other information about the communication, if available) to parsing subsystem 114.

Parsing subsystem 114 may determine whether the identifier is stored in a database. For example, the database may reside on data node 104 and store identifiers associated with various entities. In some embodiments, parsing subsystem 114 may generate a query to the database to determine whether the identifier is stored in the database. Parsing subsystem 114 may transmit the query to the database. The database may respond to the query with a record associated with the identifier or may respond with a notification indicating that the identifier is not stored in the database.

FIG. 10 illustrates a table 1000 that may be stored in the database hosted on, for example, data node 104. Table 1000 may include column 1003 indicating entity identifiers. Entity identifiers may correspond to various corporations (e.g., airlines, utilities companies, financial institutions, and others). Column 1006 may store various identifiers associated with corresponding entities. For example, the identifiers may be telephone numbers, IMEI, MAC addresses, email addresses, numeric identifiers, alphanumeric strings, or other suitable identifiers. Column 1009 may include a risk value associated with each entity. The risk value may be numeric, alphanumeric, string hexadecimal or may be stored in another format. FIG. 10 illustrates the risk value as being a decimal value between 0 and 10, where 0 indicates no risk and 10 indicates very high risk. In some embodiments, the profile may include other data (e.g., the data shown in FIG. 2).

The risk value may be calculated using various mechanisms. For example, each record may have a link to a transaction list for the corresponding entity (e.g., as shown in FIG. 4). Parsing subsystem 114 or another subsystem may access the profile associated with the entity and analyze the transactions of the entity. For example, parsing subsystem 114 may iterate through each transaction and determine whether the transaction was successful. If a high number of failed or unsuccessful transactions is detected, then the risk value may be higher. However, if a small number of unsuccessful or invalid transactions is detected, then the risk value may be low. In some embodiments, parsing subsystem 114 may use hashing for the iteration. For example, a status of the transaction may be hashed, and parsing subsystem 114 may search for a hashed status.

In some embodiments, the database may include an index that includes a list of identifiers and corresponding references to an entity in an entity table (e.g., an entity in the table of FIG. 2). FIG. 3 illustrates an indexing table with column 303 storing identifiers and column 306 storing an entity identifier or a link to the entity table. As illustrated in the table of FIG. 3, there may be multiple identifiers for the same entity. Thus, parsing subsystem 114 may query the database with the identifier and receive a response back from the database whether the identifier has been located.

In response to determining that the first identifier is stored in the database, communication processing system 102 may perform the following operations. Parsing subsystem 114 may request the record associated with the identifier. When the record is received, parsing subsystem 114 may pass the record data processing subsystem 116. Data processing subsystem 116 may receive the record and process record as described below. As shown in FIG. 10, each record may include an entity, one or more identifiers, and/or a risk value. Other data may be included in each record. Thus, the record may correspond to a particular entity (e.g., Public Service Electric & Gas Company). The profile may include one or more transactions associated with the entity. Thus, in some embodiments, the record may already include the risk value.

In some embodiments, the record may include one or more entries for an entity associated with the identifier (e.g., as shown in FIG. 4). In these instances, data processing subsystem 116 may determine, based on the one or more entries, a risk value associated with the entity (e.g., as described above). That is, data processing subsystem 116 may iterate through each transaction and determine a status of the transaction. The transaction status may be a hashed value and data processing subsystem 116 may use a hashed value for comparison during the iteration process. Based on each status, the data processing subsystem 116 may calculate the risk value. For example, the risk value may be a ratio of failed transactions to successful transactions (or to all transactions). In another example, the risk value may be a percentage of failed transactions. In some embodiments, data processing subsystem 116 may retrieve a failure reason for failed transactions and use that data to determine the risk value. For example, if a transaction failed because it was disputed, data processing subsystem 116 may flag that transaction as a risk transaction. However, if the transaction failed because there are not enough funds in the account of the user, data processing subsystem 116 may not flag that transaction as a risk transaction. Thus, data processing subsystem 116 may generate the risk value based on the flagged transactions (e.g., a ratio of flagged transactions to total transactions).

In some embodiments, data processing subsystem 116 may perform the following operations to determine the risk value associated with an entity. Data processing subsystem 116 may retrieve a transaction status associated with each of a plurality of entries associated with the record. For example, FIG. 11 illustrates a list of transactions that may be stored in a database. Table 1100 includes a column 1103 that identifies a customer, for example, by a customer identifier. The customer identifier may be a text string, a numeric string, alphanumeric, an alphanumeric string, a hexadecimal string. The customer identifier may also be stored in another suitable format (e.g., a hash representation of any of the above). Column 1106 may store transaction data for the particular customer. The transaction data may include an amount of payment that was charged, the charge date, and/or other suitable transaction data. Column 1109 may include a payment account associated with a particular transaction. The payment account may be a credit card number, debit card number, checking account number, and/or another suitable payment account. Column 1112 may store a status field of the transaction, thus indicating whether the transaction has been successfully processed. If the transaction has not been successful, column 1112 may show failure. Column 1112 also includes a reason for failure. For example, if the customer voided the transaction, disputed the transaction, or if the account is invalid or does not have enough funds, table 1100 may store an indicator for each type/reason for failure.

Data processing subsystem 116 may determine a number of invalid transactions from the plurality of entries. For example, as shown in FIG. 11, there are four invalid transactions out of five total transactions. In response to determining that the number of invalid transactions satisfies an invalidity threshold, data processing subsystem 116 may set the risk value to indicate that it is not safe to initiate the communication. For example, the threshold may be a ratio or a percentage (e.g., 5%) and if the threshold is satisfied, the risk value may be set as unsafe. In some embodiments, the risk value may be set to a number (e.g., a ratio of valid to invalid transactions or a ratio of invalid to all transactions). In some embodiments, the risk value may be set to a percentage of invalid transactions.

In some embodiments, data processing subsystem 116 may use an invalidity reason to more accurately determine the risk value. Data processing subsystem 116 may retrieve from the record a plurality of values each indicating an invalidity reason associated with a corresponding entry within the record. As shown in FIG. 11, an invalidity reason may be that the transaction was disputed successfully. Other invalidity reasons may include insufficient funds, voided transactions, etc. Thus, data processing subsystem 116 may take into account disputed transactions but not transactions that failed for insufficient funds, for example. Therefore, data processing subsystem 116 may select the user interface element based on each invalidity reason.

In some embodiments, data processing subsystem 116 may determine that the risk value satisfies a threshold. For example, as shown in FIG. 10, risk values may be on a scale of 0.0 to 10.0, with 0.0 being the least risk and 10.0 being the most risk. In some embodiments, a threshold may be set to a value of 3 indicating that any risk values three or above may indicate that it is not safe to initiate the communication, while any risk values below three may indicate that it is safe to initiate the conversation. Thus, in response to determining that the risk value satisfies the threshold, data processing subsystem 116 may select a user interface element to indicate that it is safe to initiate the communication.

In some embodiments, there may be multiple risk value ranges that are set for various graphical elements. For example, a 0-3 range may be associated with one user interface element, a range of 3-6 may be associated with another user interface element, and a range of 6-10 may be associated with the third interface element. In some embodiments, there may be two ranges each associated with a user interface element and if the identifier is not found in the database another user interface element may be selected. Thus, data processing subsystem 116 may determine that the risk value does not satisfy a threshold and, in response to determining that the risk value does not satisfy the threshold, select the user interface element to indicate that it is unsafe to initiate the communication.

Figure 12:
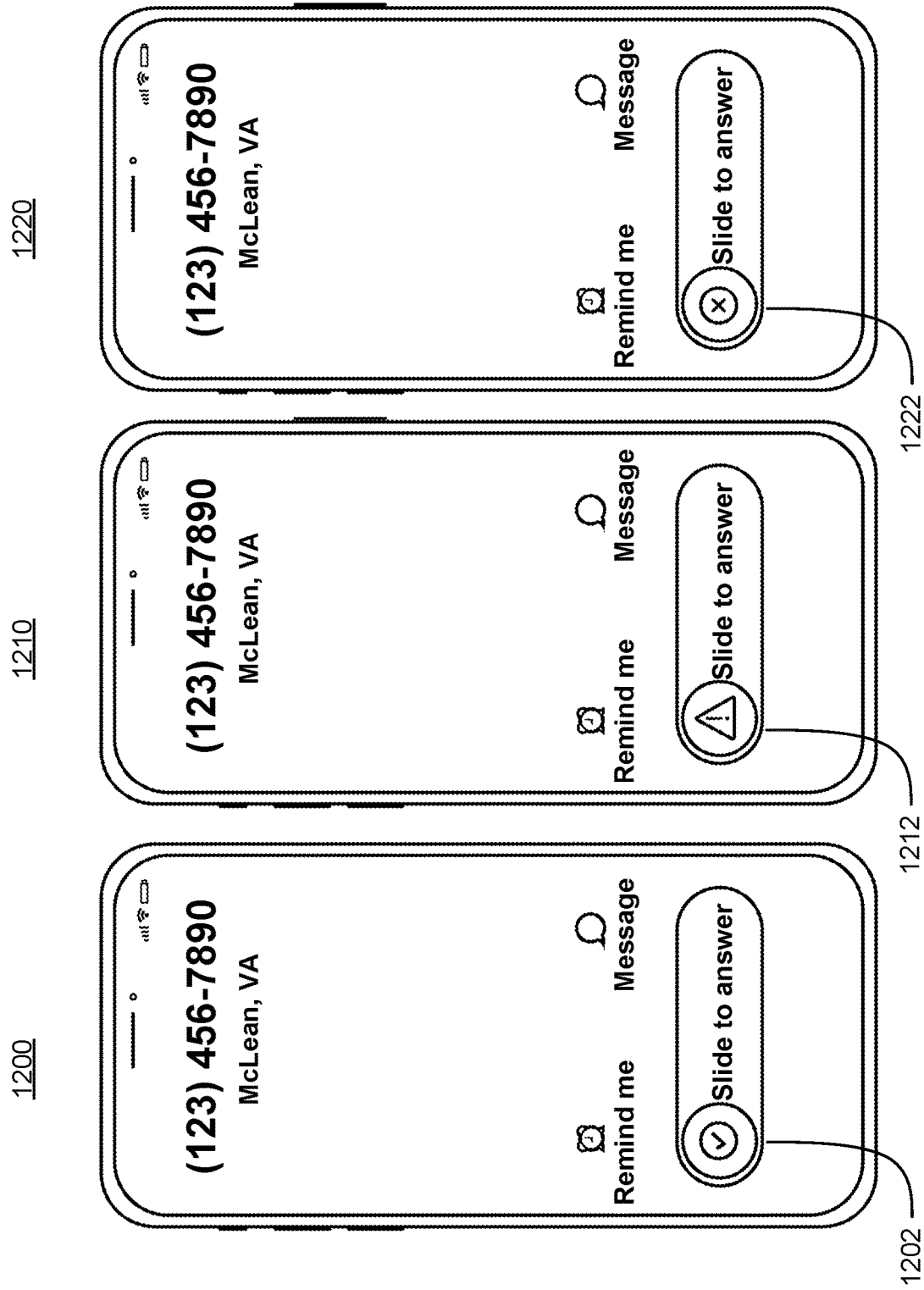
FIG. 12 illustrates additional user interfaces, in accordance with one or more embodiments.

When the risk value has been determined, data processing subsystem 116 may generate for display a user interface element that indicates the risk value. The user interface element may modify or replace an interactive icon that enables acceptance of the communication. FIG. 12 illustrates three examples of user interface elements that indicate the risk value. Screen 1200 illustrates user interactive element 1202 which indicates that the risk value does not satisfy a threshold (i.e., the risk value is low) and it is safe to initiate the communication. Screen 1210 illustrates user interactive element 1212 that indicates that it may not be safe to initiate the communication. For example, user interactive element 1212 may be displayed when an incoming telephone call is from an unknown telephone number. Screen 1220 illustrates user interactive element 1222 that indicates that it is unsafe to initiate the communication. For example, user interactive element 1222 may be displayed when an incoming telephone call is from a telephone number with a high-risk value (e.g., a known scammer).

In some embodiments, data processing subsystem 116 may determine a risk type associated with the risk value. For example, one risk type may be associated with the high risk because the entity associated with the identifier has transactions that have been disputed. Thus, in this case the risk type may be fraud. Other risk types may include a spammer; when one or more transactions show that the entity associated with the identifier initiates unsolicited communications. Data processing subsystem 116 may generate for display a third user interface element indicating the risk type.

In some embodiments, the user interactive element may be modified further if the device requesting the communication is from an entity with which the user of the device has transacted before. To perform the modification, data processing subsystem 116 may retrieve an account associated with the second communication device. For example, data processing subsystem 116 may store a table with identifiers associated with user devices and corresponding accounts (e.g., credit card numbers, checking account, debit card numbers, etc.).

Figure 13:
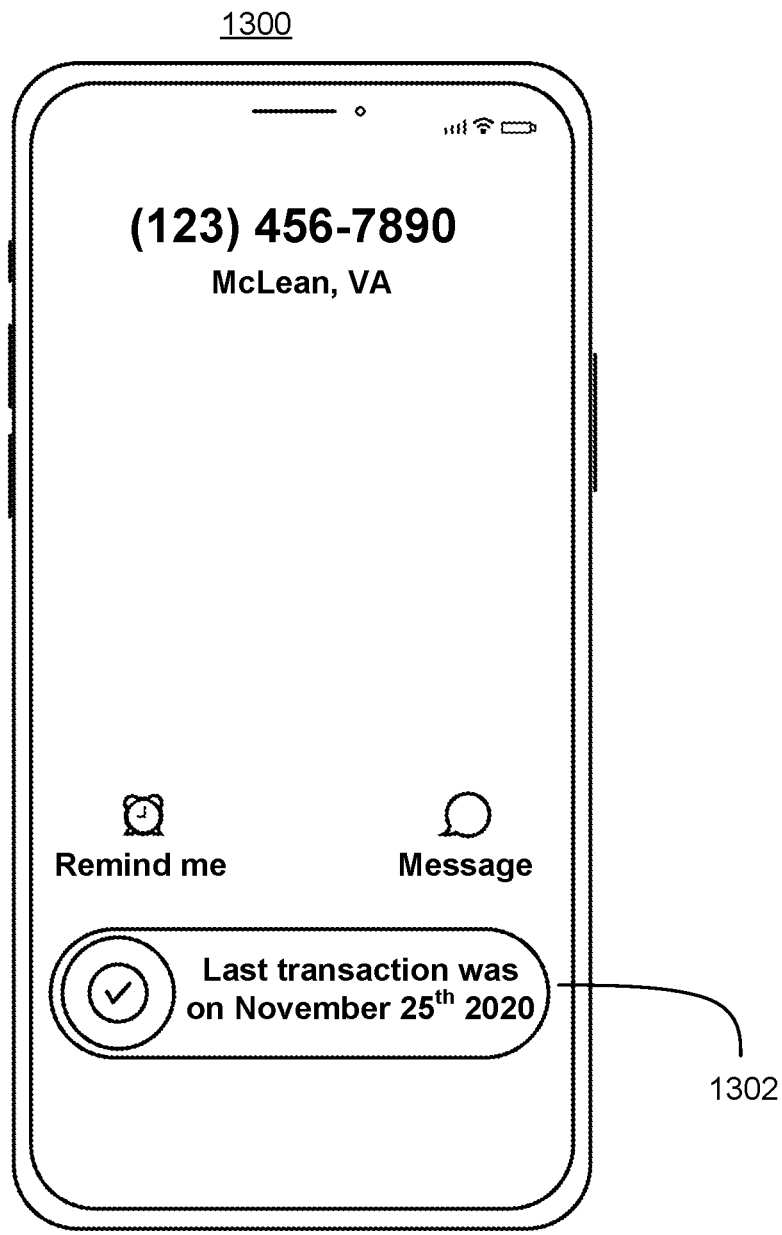
FIG. 13 illustrates an additional user interface, in accordance with one or more embodiments.

Data processing subsystem 116 may determine whether the one or more entries associated with the record include a value identifying the account. Thus, data processing subsystem 116 may iterate through each transaction for the entity associated with the first identifier and determine whether one or more transactions have a corresponding account identifier associated with the second device. In some embodiments, data processing subsystem may use hashed values during the iteration process. For example, the account identifiers within the transactions may be hashed, and data processing subsystem may hash the comparison identifier before performing the iteration process. If data processing subsystem 116 finds the account identifier within a transaction, data processing subsystem 116 may modify or replace the interactive icon with a second user interface element indicating an entry of the one or more entries. FIG. 13 illustrates display screen 1300 with the interactive icon modified to replace the words "slide to answer" with a graphic indicating the last transaction associated with the entity corresponding to the telephone number displayed on screen 1300.

In some embodiments, data processing subsystem 116 may enable a user to add an identifier to a personal safe list or unsafe list. That safe list may only be associated with that particular user (e.g., via the identifier associated with the second communication device). Data processing subsystem 116 may determine that the identifier (of the requesting communication device) is not stored in the database. For example, after iterating through all the identifiers in the database, data processing subsystem 116 may determine that the identifier is not found in the database. In response to determining that the identifier is not stored in the database, data processing subsystem 116 may perform the following operations.

Data processing subsystem 116 may generate a new record associated with the identifier. The record may be generated in the database and may be associated with the second communication device and/or the user of that second communication device. In response to determining that the communication has ended, data processing subsystem 116 may generate for display a prompt enabling input of data associated with the identifier. Data processing subsystem 116 may prompt the user for a risk level associated with the identifier. For example, the display may include a choice between a low risk level, a high risk level, and a medium risk level. In another example, there may be two choices: "Safe" and "Unsafe". Thus, data processing subsystem 116 may receive an input indicating a level of risk associated with the identifier. Data processing subsystem 116 may then generate, in the database, an entry with the level of risk. The entry may be part of the record associated with the identifier.

Figure 14:
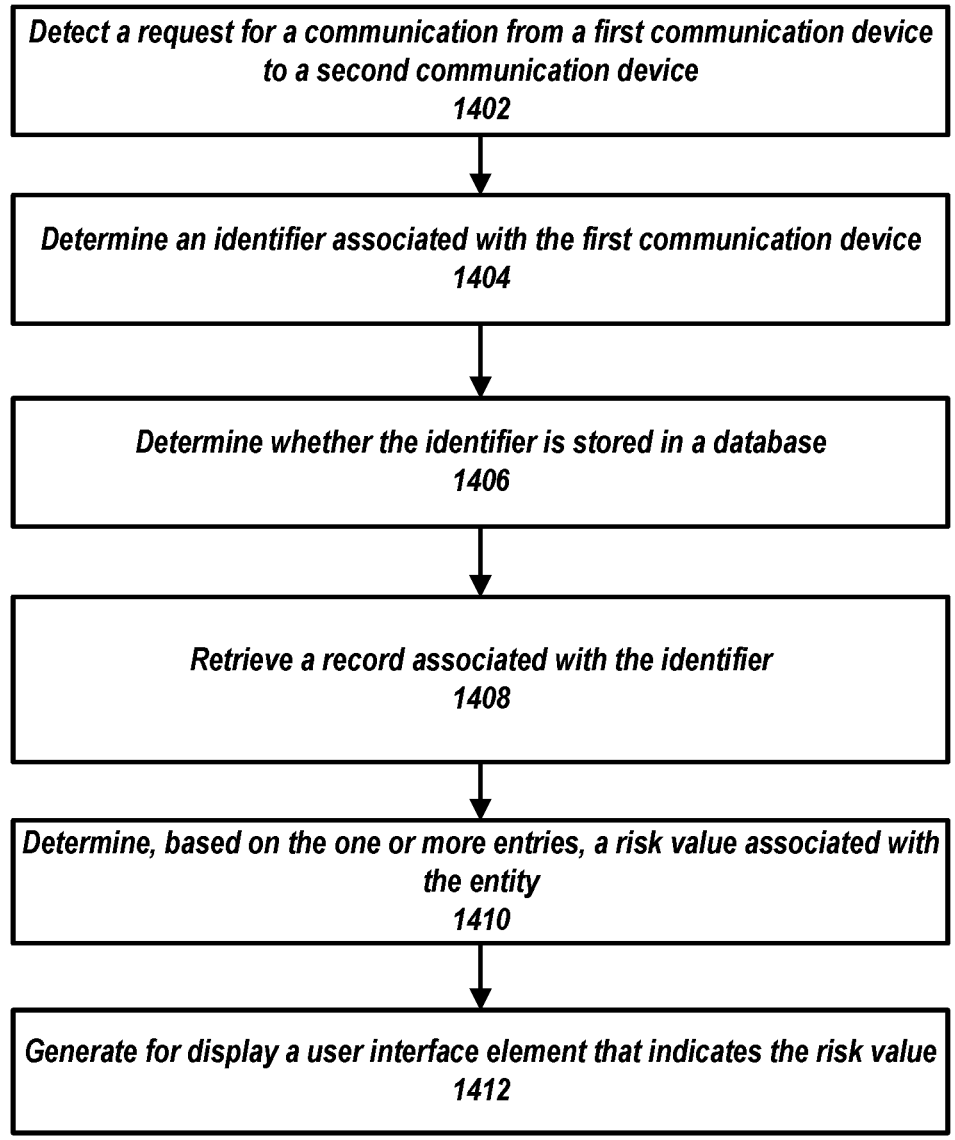
FIG. 14 is a flowchart of operations for manipulating an interactive communication acceptance icon, in accordance with one or more embodiments.

FIG. 14 is a flowchart 1400 of operations for manipulating an interactive communication acceptance icon. The operations of FIG. 14 may use components described in relation to FIG. 16 described later in this disclosure. In some embodiments, communication processing system 102 may include one or more components of computer system 1600.

At 1402, communication processing system 102 detects a request for a communication from a first communication device to a second communication device. For example, communication processing system 102 may reside on a mobile device (e.g., a smart phone or an electronic tablet). Thus, communication processing system 102 may detect an incoming phone call. In some embodiments, communication processing system 102 may reside on a server device that processes communications between two devices. Thus, communication processing system 102 may make the detection at the server.

At 1404, communication processing system 102 determines an identifier associated with the first communication device. For example, communication processing system 102 may use one or more processors 1610a-1610n to perform the determination. At 1406, communication processing system 102 determines whether the first identifier is stored in a database. For example, data processing system 102 may use one or more processors 1610a-1610n to generate a query for looking up the identifier in the database and transmit the query using network interface 1640 to the database.

At 1408, communication processing system 102 retrieves a record associated with the identifier. The record may include one or more entries for an entity associated with the identifier. For example, communication processing system 102 may generate, using one or more processors 1610a-161n, a query to retrieve the record from a database on data node 104. The query may be transmitted to data node 104 via network interface 1640. At 1410, communication processing system 102 determines, based on the one or more entries, a risk value associated with the entity. Communication processing system 102 may make the determination using one or more processors 1610a-1610n. At 1412, communication processing system 102 generates for display a user interface element that indicates the risk value. The user interface element may modify or replace an interactive icon that enables acceptance of the communication. In some embodiments, e.g., where communication processing system 102 resides on server device and not on one of the communication devices involved in the communications, communication processing system 102 may generate a command to generate for display the user interface element and provide, with the command for example, information to be used in generating the user interface element. Operations 1408 to 1414 may be performed in response to determining that the identifier is stored in the database:

The present techniques will be better understood with reference to the following enumerated embodiments:

1. A method comprising: detecting a request for a communication from a first communication device to a second communication device; determining an identifier associated with the first communication device; determining whether the identifier is stored in a database; and in response to determining that the identifier is stored in the database: retrieving a record associated with the identifier, wherein the record comprises one or more entries for an entity associated with the identifier; determining, based on the one or more entries, a risk value associated with the entity; and generating for display a user interface element that indicates the risk value, wherein the user interface element modifies or replaces an interactive icon that enables acceptance of the communication.
2. The method of any of the preceding embodiments, further comprising: determining that the risk value satisfies a threshold; and in response to determining that the risk value satisfies the threshold, selecting the user interface element to indicate that it is safe to initiate the communication.
3. The method of any of the preceding embodiments, further comprising: determining that the risk value does not satisfy a threshold; and in response to determining that the risk value does not satisfy the threshold, selecting the user interface element to indicate that it is unsafe to initiate the communication.
4. The method of any of the preceding embodiments, wherein determining the risk value associated with the entity comprises: retrieving a transaction status associated with each of a plurality of entries associated with the record; determining a number of invalid transactions from the plurality of entries; and in response to determining that the number of invalid transactions satisfies an invalidity threshold, setting the risk value to indicate that it is not safe to initiate the communication.
5. The method of any of the preceding embodiments, further comprising: retrieving from the record a plurality of values each indicating an invalidity reason associated with a corresponding entry within the record; and selecting the user interface element based on each invalidity reason.
6. The method of any of the preceding embodiments, further comprising: retrieving an account associated with the second communication device; determining whether the one or more entries associated with the record include a value identifying the account or a different account; and generating for display, a second user interface element indicating an entry of the one or more entries.
7. The method of any of the preceding embodiments, further comprising: determining that the identifier is not stored in the database; and in response to determining that the identifier is not stored in the database: generating a new record associated with the identifier; in response to determining that the communication has ended, generating for display a prompt enabling input of data associated with the identifier; receiving an input indicating a level of risk associated with the identifier; and generating, in the database, an entry in association with the identifier, wherein the entry comprises the level of risk.
8. The method of any of the preceding embodiments, further comprising: determining a risk type associated with the risk value; and generating for display a third user interface element indicating the risk type.
9. A system comprising: one or more processors; and memory storing instructions that, when executed by the processors, cause the processors to effectuate operations comprising those of any of embodiments 1-8.
10. A system comprising means for performing any of embodiments 1-8.
11. A system comprising cloud-based circuitry for performing any of embodiments 1-8.

Restricting Access to Accounts Based on Voice Communication Parameters

Communication processing system 102 may be configured to restrict access to accounts based on voice communication parameters using its subsystems. Communication detection subsystem 112 may detect a communication between a first communication device and a second communication device. For example, communication detection subsystem 112 may reside on a voice-enabled communication device (e.g., a smart phone, an electronic tablet, or another suitable device). The communication detection subsystem may detect that a first device has called the second device and a voice conversation has started. Thus, in some embodiments, the first and second devices may be voice-enabled communication devices (e.g., smart phones). In some embodiments, a communication device that initiated the communication (e.g., the device that initiated the phone call) may be an autonomous system that is communicating with the other communication device to relay an automated message (e.g., a robo call).

In some embodiments, communication detection subsystem 112 may use an Application Programming Interface (API) to detect the communication between the first communication device to the second communication device. For example, the API may enable the communication detection subsystem to get notifications when an incoming communication is initiated (e.g., when a phone call is answered). This may be accomplished by having communication detection subsystem 112 to subscribe to alerts (e.g., using the API) so that communication detection subsystem 112 is alerted when the communication is started.

In some embodiments, communication detection subsystem 112 may reside on the communication device that is receiving the communication while, in some embodiments, communication detection subsystem 112 may reside on a server device (e.g., a server device that processes communications between devices). When communication detection subsystem 112 resides on the communication device, the operating system of the communication device may include the API to notify communication detection subsystem 112 when the communication has started. When communication detection subsystem 112 resides on the server device, server software that processes/routes communication may include the API to notify the communication detection subsystem 112.

When communication detection subsystem 112 detects the request for the communication, communication detection subsystem 112 may retrieve a plurality of parameters associated with the communication. The parameters may include an identifier of the communication device that initiated the call (e.g., a phone number, an identifier associated with the communication device for a particular application, a voice identifier generated based on voice data being received from the second communication device and/or other suitable parameters). Thus, if the initiated communication is a telephone call, communication detection subsystem 112 may receive a telephone number associated with the communication device that is requesting the communication. The telephone number may be received as part of caller identifying technology. In another example, the initiated communication may be a communication using an application to enable Internet voice communication. One example of such application may be WhatsApp™ while another is Signal™. Thus, each Internet application may have an identifier associated with a particular user and/or a particular device which may be used on various communication devices when the user logs into the application. In some embodiments, however, the identifier may be a device identifier such as an International Mobile Equipment Identity (IMEI) or a Media Access Control (MAC) address.

In yet another example, the communication may be a communication using a messaging service (e.g., via Simple Message Service (SMS) and/or Multimedia Messaging Service (MMS)). Thus, in some embodiments, (e.g., where the communication is transmitted through an application that enables users to communicate through the Internet) communication detection subsystem 112 determines whether the communication is a voice communication or non-voice communication (e.g., text or image). In some embodiments, voice communication may be a communication using a combination of video and audio. Communication detection subsystem 112 may pass the plurality of parameters (and other information about the communication, if available) to data processing subsystem 116.

Data processing subsystem 116 may determine, based on the plurality of parameters associated with the communication, a risk level associated with the communication. Data processing subsystem 116 may use various mechanisms to make the determination. Data processing subsystem 116 may use a voice print of, for example, the caller in determining the communication risk. In particular, data processing subsystem 116 may generate a voice identifier based on voice data being received from the second communication device. Data processing subsystem 116 may determine, based on the voice identifier, that a voice being received from the second communication device is synthesized. For example, data processing subsystem 116 may compare the signature of the voice to known synthesized voices to determine whether the voice is synthesized. Based on determining that the voice being received from the second communication device is synthesized, data processing subsystem 116 may determine that the risk level associated with the communication exceeds the risk threshold.

In some embodiments, data processing subsystem 116 may compare the voice identifier being received with a voice identifier of known scammers and/or spammers. Based on determining a match with one of those voice identifiers, data processing subsystem 116 may determine that the risk level associated with the communication exceeds the risk threshold.

Another mechanism of determining a risk level associated with the communication may involve identifying an entity corresponding to the identifier associated with the device that initiated the communication. Data processing subsystem 116 may extract from the plurality of parameters an identifier of the second communication device. As described above, the identifier of the second communication device may be a telephone number associated with that device. The identifier may also be an identifier created by an application that enables Internet voice communication. One example of such application may be WhatsApp™ while another is Signal™. Thus, each Internet application may have an identifier associated with a particular user which may be used on various communication devices when the user logs into the application. Thus, the identifier associated with the device may be one of those identifiers. In some embodiments, however, the identifier may be a device identifier such as an International Mobile Equipment Identity (IMEI) or a Media Access Control (MAC) address.

Data processing subsystem 116 may compare the identifier of the second communication device with each of a plurality of communication device identifiers stored in device database. The device database may be hosted on data node 104 or at another suitable location. Each of the plurality of communication device identifiers is associated with a risk that satisfies the risk threshold. That is, each identifier of the plurality of identifiers may be an identifier that is known to be associated with an entity that is associated with a high risk (e.g., a known scammer or a known spammer). For example, a database table may store a list of entities, identifiers associated with those entities and a risk level (e.g., as illustrated in FIG. 10). Although the risk value in FIG. 10 is numeric, the risk values in FIG. 10 may be based on any risk value scale or scheme. For example, the risk value scale may be a Boolean (e.g., True for risky and False for not risky). In some embodiments, the list may only include entities with a risk value above the threshold. That is, the list of identifiers associated with scammers and/or spammer.

Data processing subsystem 116 may determine, based on the comparing, that the identifier of the second communication device matches a communication device identifier of the plurality of communication device identifiers. In response to determining that the identifier of the second communication device matches the communication device identifier of the plurality of communication device identifiers, data processing subsystem 116 may determine that the risk level of the communication exceeds the risk threshold. That is, if the risk value of the identifier is higher than the threshold, then the identifier is determined to be a scammer, or a spammer associated identifier. In some embodiments, if the identifier is found in the list, then the identifier is determined to be a scammer, or a spammer associated identifier.

Figure 15:
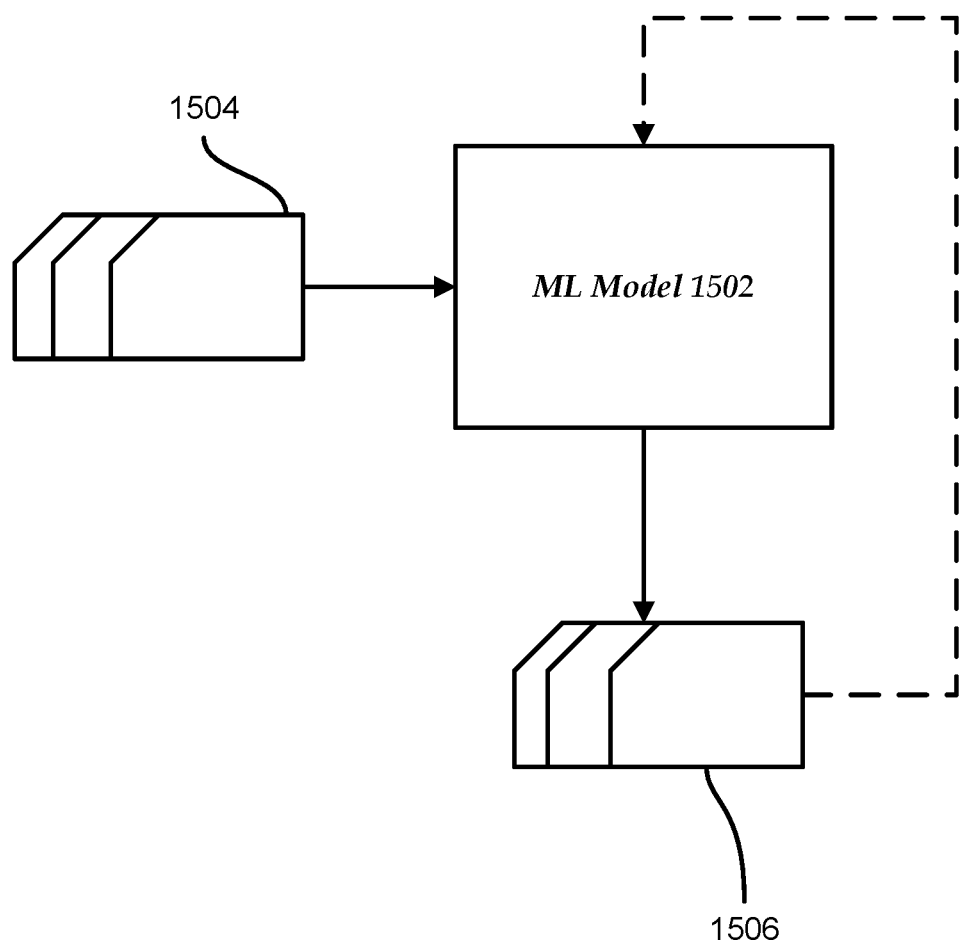
FIG. 15 illustrates an exemplary machine learning model, in accordance with one or more embodiments.

Another mechanism for determining a risk level associated with the communication is to use a machine learning algorithm. For example, the detected parameters may be inputted into a machine learning model to obtain a probability of whether the communication is safe or not safe or obtain a risk level associated with the communication. FIG. 15 illustrates an exemplary machine learning model, in accordance with one or more embodiments. Machine learning model 1502 may take input 1504 (e.g., a vector representing the parameters associated with the communication) and may output a risk level or a probability that the communication is unsafe.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In response to determining that the risk level of the communication is greater than or equal to a risk threshold, data processing subsystem 116 may initiate monitoring of the communication. Monitoring may include periodically receiving a transcript of the communication if the communication is a voice conversation. If the communication is a messaging conversation, data processing subsystem 116 may receive the messages that are sent back and forth between the two communication devices.

Data processing subsystem 116 may detect, based on monitoring of the communication, account access information indicated in the communication. For example, data processing subsystem 116 may perform the detecting via a number of mechanisms. One of the mechanisms may involve analyzing a transcript of the voice communication as it is received. In particular, data processing subsystem 116 may access a user account associated with a user of the first communication device. For example, data processing subsystem 116 may have access to a database that stores various account identifiers associated with various users. The database may be on a user device (e.g., a communication device) and may be in a form of a digital wallet that stores credit card numbers, debit card numbers, checking account numbers, etc. In some embodiments, account numbers may be stored within one or more applications on the user device (e.g., in one or more credit card/bank applications). In some embodiments, the database may be stored in a remote system (e.g., data node 104) or on one or more of the account servers 108a-108n.

Data processing subsystem 116 may retrieve one or more account identifiers associated with the user account. The account identifiers may be textual identifiers (e.g., credit card numbers, debit card numbers, checking account numbers, and/or others). In some embodiments, the account identifiers may be images (e.g., images of checks, images of credit cards, and/or images of debit cards). Data processing subsystem 116 may periodically receive a transcript of a latest portion of the communication. The transcript may be generated by using a voice recognition algorithm to translate the voice conversation into text. In some embodiments, for example, where the communication is a data communication (e.g., text/image messages), the text of the communication and the images may be received.

Data processing subsystem 116 may search each transcript for the one or more account identifiers. For example, data processing subsystem 116 may perform a text search for the account identifiers. In some embodiments (e.g., where the communication is a text/image communication), data processing subsystem 116 may search through the text/image data to identify account information. Furthermore, data processing subsystem 116 may detect an image within the communication. For example, if the communication is performed through an application such as a messaging application, data processing subsystem 116 may receive the text and any images detected within the application. Data processing subsystem 116 may determine that the image includes account identifying information. For example, a user may take a digital photograph of the user's credit card, debit card, or check and send it within the messaging conversation. Data processing subsystem 116 may detect the image within the digital photograph. For example, data processing subsystem 116 may use a machine learning model to perform the detection (e.g., a machine learning model disclosed in connection with FIG. 15). In response to locating the one or more account identifiers in a particular textual transcript, data processing subsystem 116 may detect the account access information in the communication.

In response to detecting the account access information in the communication, updating an account associated with the account access information with a restriction. The restriction restricts one or more actions associated with the account. In some embodiment, the account restriction may place one or more restrictions on the account. For example, one restriction may be a spending amount restriction, another restriction may be a temporary suspension of the account. To update the account with the restriction, data processing subsystem 116 may pass an indication that the account access information was detected in the communication to account updating subsystem 118. The information may include the account number detected within the communication.

Account updating subsystem 118 may send a query to one or more account servers 108a-108n to determine whether the account exists. In some embodiments, account servers 108a-108n may publish an API that enables account updating subsystem 118 to send restrictions to those account servers. Thus, account updating subsystem 118 may transmit, to account servers 108a-108n, one or more commands to place restrictions onto the identified account. Account updating subsystem 118 may also be enabled to remove restrictions when appropriate by sending commands to account servers 108a-108n.

In some embodiments, the restriction may be a restriction to update certain account information so that a bad actor may be prevented from gaining control of the account. In particular, account updating subsystem 118 may transmit a command to account servers 108a-108n to set a flag on one or more parameters associated with the account. The flag may cause an additional authentication request to be initiated when a request to update the one or more parameters is received. For example, some of those parameters may be electronic mail address, telephone number, physical address, and/or spending limits. If an update request is sent for any of those parameters (e.g., from an electronic device), account servers 108a-108n may request additional authentication to perform the change (e.g., two-factor authentication).

In some embodiments, communication processing system 102 may be notified when an update of a flagged parameter is attempted. In particular, communication processing system 102 may receive a notification of an update request for a flagged parameter associated with the account. The update request may indicate that a bad actor is attempting to take over the account. Thus, communication processing system 102 may provide the notification to the user with a prompt including data from within the update request. For example, the prompt may indicate that an account needs to be secured or replaced with a new account (e.g., a new account number may need to be assigned).

In some embodiments, the restrictions may be temporary. That is, it may be determined that if no anomalous activity is detected for a threshold period of time, the restrictions may be removed. Thus, in some embodiments, account updating subsystem 118 may send a command to account servers 108a-108n that includes an expiration date/time for the restriction. In some embodiments, the expiration time may be set based on the risk value. In particular, account updating subsystem 118 may retrieve account data associated with the second communication device, and determine, based on the account data, a risk value associated with the second communication device. Account updating subsystem 118 may retrieve the risk value from a database table (e.g., as shown in FIG. 10) or from another location described in connection with FIG. 10. In some embodiments, account updating system 118 may calculate the risk value from the transaction data (e.g., as shown in FIG. 11 and/or FIG. 4) as described in connection with FIGS. 4 and 11. Account updating subsystem 118 may determine an expiration time for the restriction based on the risk value associated with the second communication device. For example, the higher the risk value, the higher the expiration time may be set.

Figure 16:
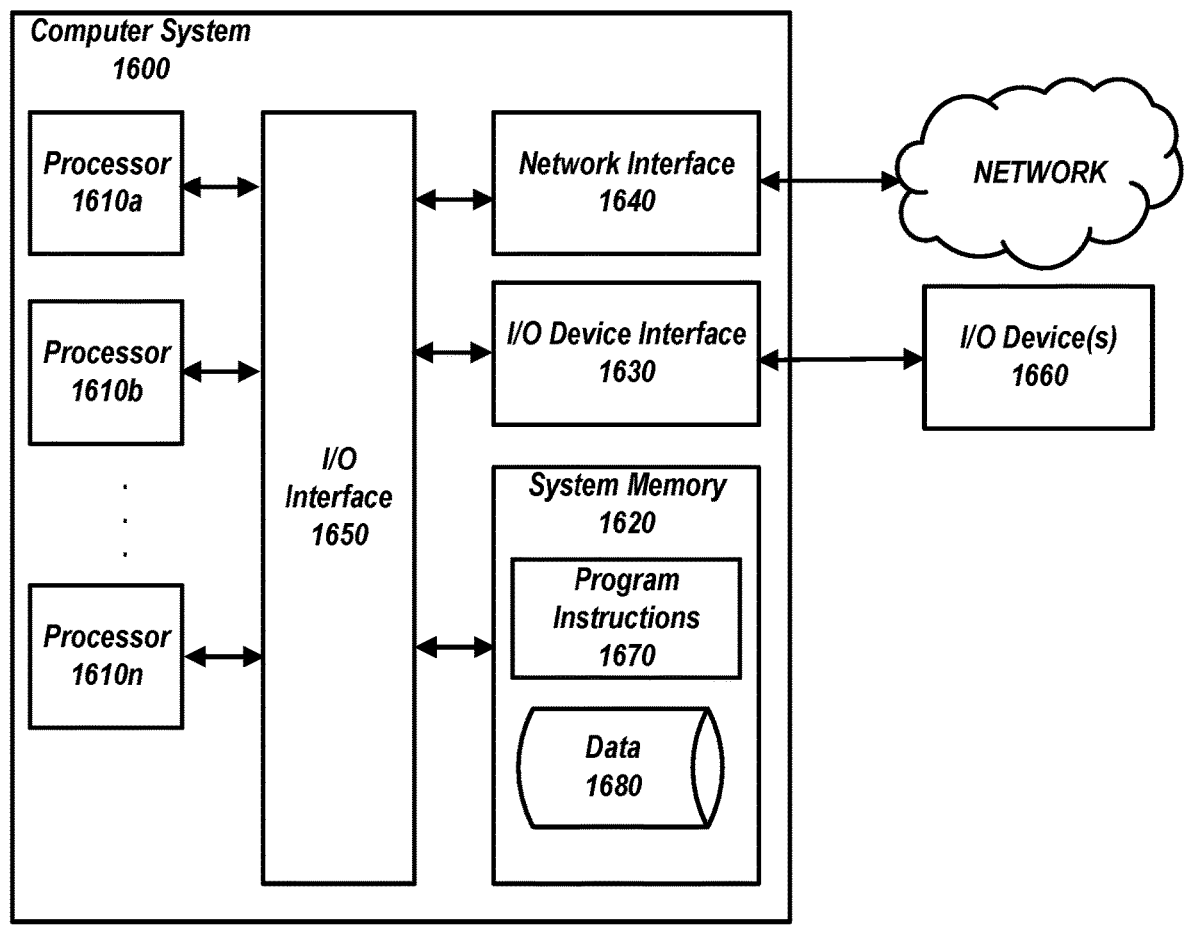
FIG. 16 shows an example computing system that may be used in accordance with one or more embodiments.
Figure 17:
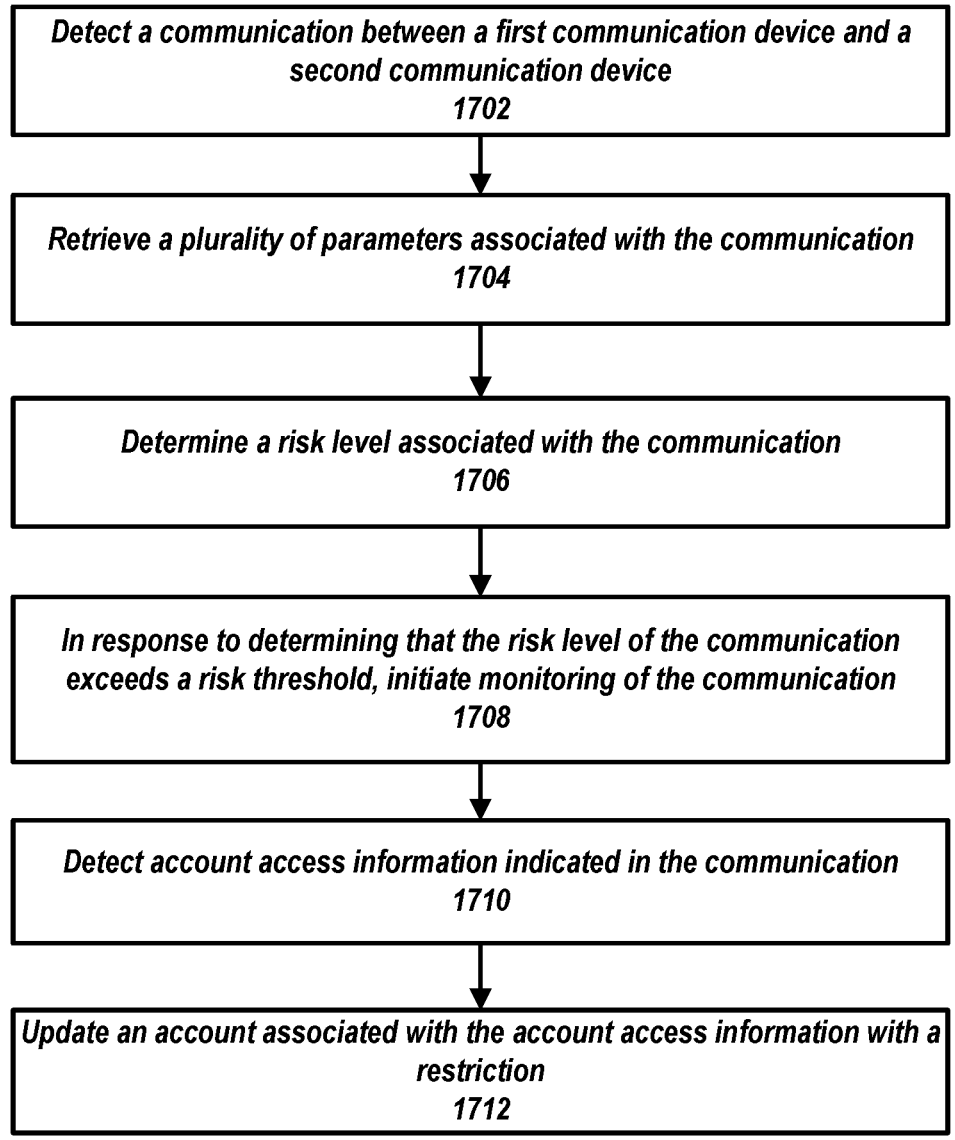
FIG. 17 is a flowchart of operations for and restricting access to accounts based on voice communication parameters, in accordance with one or more embodiments.

FIG. 17 is a flowchart 1700 of operations for restricting access to accounts based on voice communication parameters. The operations of FIG. 17 may use components described in relation to FIG. 16. In some embodiments, communication processing system 102 may include one or more components of computer system 1600.

At 1702, communication processing system 102 detects a communication between a first communication device and a second communication device. For example, communication processing system 102 may reside on a mobile device (e.g., a smart phone or an electronic tablet). Thus, communication processing system 102 may detect an incoming phone call. In some embodiments, communication processing system 102 may reside on a server device that processes communications between two devices. Thus, communication processing system 102 may make the detection at the server.

At 1704, communication processing system 102 retrieves a plurality of parameters associated with the communication. For example, the communication processing system 102 may retrieve the plurality of parameters from system memory 1620. At 1706, communication processing system 102 determines a risk level associated with the communication. The risk level may be determined based on the plurality of parameters associated with the communication. For example, communication processing system 102 may use one or more processors 1610a-1610n to perform the determination. At 1708, communication processing system 102, in response to determining that the risk level of the communication exceeds a risk threshold, initiates monitoring of the communication. For example, communication processing system 102 may use an I/O device 1600 to monitor the communication and stored the monitoring data in system memory 1620.

At 1710, communication processing system 102 detects, account access information indicated in the communication. The detection may be based on monitoring data within the communication. For example, communication processing system 102 may use one or more processors 1610a-1610n to perform the detection. At 1712, communication processing system 102 updates an account associated with the account access information with a restriction. The restriction may restrict one or more actions associated with the account. For example, communication processing system 102 may use network interface 1640 to transmit a command to a server (e.g., one or more of account servers 108a-108n). In some embodiments, the update may be performed in response to detecting the account access information in the communication.

Computing Environment

FIG. 16 shows an example computing system that may be used in accordance with some embodiments of this disclosure. In some instances, computing system 1600 is referred to as a computer system. A person skilled in the art would understand that those terms may be used interchangeably. The components of FIG. 16 may be used to perform some or all operations discussed in relation with FIGS. 1-15. Furthermore, various portions of the systems and methods described herein may include or be executed on one or more computer systems similar to computing system 1600. Further, processes and modules described herein may be executed by one or more processing systems similar to that of computing system 1600.

Computing system 1600 may include one or more processors (e.g., processors 1610a-1610n) coupled to system memory 1620, an input/output (I/O) device interface 1630, and a network interface 1640 via an input/output (I/O) interface 1650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1620). Computing system 1600 may be a uni-processor system including one processor (e.g., processor 1610a), or a multi-processor system including any number of suitable processors (e.g., 1610a-1610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1600 may include a plurality of computing devices (e.g., distributed computer systems) to implement various processing functions.

I/O device interface 1630 may provide an interface for connection of one or more I/O devices 1660 to computer system 1600. I/O devices may include devices that receive input (e.g., from a user) or output information (e.g., to a user). I/O devices 1660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1660 may be connected to computer system 1600 through a wired or wireless connection. I/O devices 1660 may be connected to computer system 1600 from a remote location. I/O devices 1660 located on remote computer systems, for example, may be connected to computer system 1600 via a network and network interface 1640.

Network interface 1640 may include a network adapter that provides for connection of computer system 1600 to a network. Network interface 1640 may facilitate data exchange between computer system 1600 and other devices connected to the network. Network interface 1640 may support wired or wireless communication. The network may include an electronic communication network, such as the Internet, a local area network (LAN), a wide area network (WAN), a cellular communications network, or the like.

System memory 1620 may be configured to store program instructions 1670 or data 1680. Program instructions 1670 may be executable by a processor (e.g., one or more of processors 1610a-1610n) to implement one or more embodiments of the present techniques. Instructions 1670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 1620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1620 may include a non-transitory computer readable storage medium that may have program instructions stored thereon that are executable by a computer processor (e.g., one or more of processors 1610a-1610n) to cause the subject matter and the functional operations described herein. A memory (e.g., system memory 1620) may include a single memory device and/or a plurality of memory devices (e.g., distributed memory devices).

I/O interface 1650 may be configured to coordinate I/O traffic between processors 1610a-1610n, system memory 1620, network interface 1640, I/O devices 1660, and/or other peripheral devices. I/O interface 1650 may perform protocol, timing, or other data transformations to convert data signals from one component (e.g., system memory 1620) into a format suitable for use by another component (e.g., processors 1610a-1610n). I/O interface 1650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1600, or multiple computer systems 1600 configured to host different portions or instances of embodiments. Multiple computer systems 1600 may provide for parallel or sequential processing/execution of one or more portions of the techniques described herein.

Those skilled in the art will appreciate that computer system 1600 is merely illustrative and is not intended to limit the scope of the techniques described herein. Computer system 1600 may include any combination of devices or software that may perform or otherwise provide for the performance of the techniques described herein. For example, computer system 1600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

The present techniques will be better understood with reference to the following enumerated embodiments:

1. A method comprising: detecting a communication between a first communication device and a second communication device; retrieving a plurality of parameters associated with the communication; determining, based on the plurality of parameters associated with the communication, a risk level associated with the communication; in response to determining that the risk level of the communication exceeds a risk threshold, initiating monitoring of the communication; detecting, based on monitoring of the communication, account access information indicated in the communication; and in response to detecting the account access information in the communication, updating an account associated with the account access information with a restriction, wherein the restriction restricts one or more actions associated with the account.
2. The method of any of the preceding embodiments, wherein determining that the risk level of the communication exceeds the risk threshold comprises: extracting from the plurality of parameters an identifier of the second communication device; comparing the identifier of the second communication device with each of a plurality of communication device identifiers stored in device database, wherein each of the plurality of communication device identifiers is associated with a risk that satisfies the risk threshold; determining, based on the comparing, that the identifier of the second communication device matches a communication device identifier of the plurality of communication device identifiers; and in response to determining that the identifier of the second communication device matches the communication device identifier of the plurality of communication device identifiers, determining that the risk level of the communication exceeds the risk threshold.
3. The method of any of the preceding embodiments, wherein detecting the account access information in the communication comprises: accessing a user account associated with a user of the first communication device; retrieving one or more account identifiers associated with the user account; periodically receiving a textual transcript of a latest portion of the communication; searching each textual transcript for the one or more account identifiers; and in response to locating the one or more account identifiers in a particular textual transcript, detecting the account access information in the communication.
4. The method of any of the preceding embodiments, wherein updating the account with the restriction comprises setting a flag on one or more parameters, wherein the flag causes an additional authentication request to be initiated when a request to update the one or more parameters is received.
5. The method of any of the preceding embodiments, further comprising: receiving a notification of an update request for a parameter associated with the account, wherein the parameter has been flagged; and providing the notification to the user with a prompt including data from within the update request.
6. The method of any of the preceding embodiments, further comprising: retrieving account data associated with the second communication device; determining, based on the account data, a risk value associated with the second communication device; and determining an expiration time for the restriction based on the risk value associated with the second communication device.
7. The method of any of the preceding embodiments, wherein determining that the risk level associated with the communication exceeds the risk threshold comprises: generating a voice identifier based on voice data being received from the second communication device; determining, based on the voice identifier, that a voice being received from the second communication device is synthesized; and based on determining that the voice being received from the second communication device is synthesized, determining that the risk level associated with the communication exceeds the risk threshold.
8. The method of any of the preceding embodiments, wherein the communication is an electronic message exchange and wherein detecting the account access information in the communication comprises: detecting an image within the communication; and determining that the image comprises account identifying information.
9. A system comprising: one or more processors; and memory storing instructions that, when executed by the processors, cause the processors to effectuate operations comprising those of any of embodiments 1-8.
10. A system comprising means for performing any of embodiments 1-8.
11. A system comprising cloud-based circuitry for performing any of embodiments 1-8.

What is claimed is:

1. A system for generating a screening interface for communications, the system comprising:
one or more processors; and
a non-transitory computer-readable storage medium storing instructions, which when executed by the one or more processors cause the one or more processors to:
detect a request for a communication from a first communication device to a second communication device;
receive a first profile associated with the first communication device, wherein the first profile comprises a plurality of entries for a plurality of records, wherein the plurality of records is associated with a first entity corresponding to the first communication device; and
in response to determining that the first profile includes entries having an account identifier associated with the second communication device, select an entry of the entries based on a recency of timestamps associated with the entries, and generate for display on a communication acceptance screen an indicator of an entry associated with a latest timestamp.

2. The system of claim 1, wherein the instructions, when executed by the one or more processors, further cause the one or more processors to:
   detect a second request for a second communication from a third communication device to the second communication device;
   determine a second identifier associated with the third communication device;
   determine whether the second identifier is stored in a database;
   in response to determining that the second identifier is stored in the database, retrieve a second profile associated with the third communication device, wherein the second profile comprises a risk level associated with a second entity corresponding to the second profile; and
   in response to determining that the risk level satisfies a threshold, modify or replace an interactive icon that enables accepting the communication with an indication of the risk level.

3. The system of claim 2, wherein the instructions further, cause the one or more processors to:
   determine based on a session initiation protocol identifier certificate an attestation level associated with the first communication device; and
   generate the risk level for the first communication device based on the attestation level.

4. The system of claim 1, wherein the instructions, when executed by the one or more processors, further cause the one or more processors to:
   retrieve the entry of the plurality of entries that includes the account identifier;
   determine, based on the entry, an item associated with an account corresponding to the account identifier; and
   generate for display on the communication acceptance screen an indication of the item.

5. A method comprising:
   detecting a request for a communication from a first communication device to a second communication device;
   receiving a first profile associated with the first communication device, wherein the first profile comprises one or more entries corresponding to an entity associated with the first communication device;
   determining whether the one or more entries include an account identifier associated with the second communication device; and
   in response to determining that the one or more entries include the account identifier, generating for display, on a communication acceptance screen, an indicator of an entry of the one or more entries that includes the account identifier.

6. The method of claim 5, further comprising:
   determining that the one or more entries do not include any entry with the account identifier and includes a second entry with a different account identifier; and
   in response to determining that the one or more entries do not include the account identifier and includes the different account identifier, generating for display, on the communication acceptance screen, an indication of the entity associated with the first communication device.

7. The method of claim 5, further comprising:
   in response to determining that a first identifier associated with the first communication device is not stored in a database, modify or replace an interactive communication acceptance icon with indication that the first identifier is not stored in the database.

8. The method of claim 5, wherein retrieving the account identifier associated with the second communication device comprises:
   retrieving a second identifier associated with the second communication device;
   comparing the second identifier with a plurality of identifiers associated with a plurality of accounts;
   determining, based on comparing the second identifier with the plurality of identifiers, that the second identifier matches an identifier corresponding to an account of the plurality of accounts; and
   retrieving the account identifier associated with the account of the plurality of accounts.

9. The method of claim 5, wherein the communication acceptance screen comprises a date associated with the entry of the one or more entries.

10. The method of claim 5, further comprising:
    detecting a second request for a second communication from a third communication device to the second communication device;
    determining a second identifier associated with the third communication device;
    determining whether the second identifier is stored in a database;
    in response to determining that the second identifier is stored in the database, retrieving a second profile associated with the third communication device, wherein the second profile comprises a flag that indicates a risk level associated with the third communication device; and
    in response to determining that the risk level satisfies a threshold, modifying or replacing an interactive icon with an indication of the risk level.

11. The method of claim 5, further comprising:
    determining based on a session initiation protocol identifier certificate an attestation level associated with the first communication device; and
    generating a risk level for the first communication device based on the attestation level.

12. The method of claim 5, further comprising:
    retrieving the one or more entries that include the account identifier;
    determining, based on the one or more entries, an item associated with an account corresponding to the account identifier; and
    generating for display, on the communication acceptance screen, an indication of the item.

13. A non-transitory, computer-readable medium for generating a screening interface for communications, storing instructions that when executed by one or more processors, cause the one or more processors to perform operations comprising:
    detecting a request for a communication from a first communication device to a second communication device;
    receiving a first profile associated with the first communication device, wherein the first profile comprises one or more entries corresponding to an entity associated with the first communication device;
    determining whether the one or more entries include an account identifier associated with the second communication device; and
    in response to determining that the one or more entries include the account identifier, generating for display, on a communication acceptance screen, an indicator of an entry of the one or more entries that includes the account identifier.

14. The non-transitory, computer-readable medium of claim 13, wherein the instructions further cause the one or more processors to perform operations comprising:
   determining that the one or more entries do not include any entry with the account identifier and includes a second entry with a different account identifier; and
   in response to determining that the one or more entries do not include the account identifier and includes the different account identifier, generating for display, on the communication acceptance screen, an indication of the entity associated with the first communication device.

15. The non-transitory, computer-readable medium of claim 13, wherein the instructions further cause the one or more processors to perform operations comprising:
   in response to determining that a first identifier associated with the first communication device is not stored in a database, modifying or replacing an interactive communication acceptance icon with an indication that the first identifier is not stored in the database.

16. The non-transitory, computer-readable medium of claim 13, wherein the instructions for retrieving the account identifier associated with the second communication device further cause the one or more processors to perform the operations comprising:
   retrieving a second identifier associated with the second communication device;
   comparing the second identifier with a plurality of identifiers associated with a plurality of accounts;
   determining, based on comparing the second identifier with the plurality of identifiers, that the second identifier matches a identifier corresponding to an account of the plurality of accounts; and
   retrieving the account identifier associated with the account of the plurality of accounts.

17. The non-transitory, computer-readable medium of claim 13, wherein the communication acceptance screen comprises a date associated with the entry of the one or more entries.

18. The non-transitory, computer-readable medium of claim 13, wherein the instructions further cause the one or more processors to perform operations comprising:
   detecting a second request for a second communication from a third communication device to the second communication device;
   determining a second identifier associated with the third communication device;
   determining whether the second identifier is stored in a database;
   in response to determining that the second identifier is stored in the database, retrieving a second profile associated with the third communication device, wherein the second profile comprises a flag that indicates a risk level associated with the third communication device; and
   in response to determining that the risk level satisfies a threshold, modifying or replacing an interactive icon with an indication of the risk level.

19. The non-transitory, computer-readable medium of claim 13, wherein the instructions further cause the one or more processors to perform operations comprising:
   determining based on a session initiation protocol identifier certificate an attestation level associated with the first communication device; and
   generating a risk level for the first communication device based on the attestation level.

20. The non-transitory, computer-readable medium of claim 13, wherein the instructions further cause the one or more processors to perform operations comprising:
   retrieving the one or more entries that include the account identifier;
   determining, based on the one or more entries, an item associated with an account corresponding to the account identifier; and
   generating for display, on the communication acceptance screen, an indication of the item.

* * * * *